US012169391B2

(12) United States Patent
Calic et al.

(10) Patent No.: US 12,169,391 B2
(45) Date of Patent: Dec. 17, 2024

(54) WEARABLE OBJECT, IN PARTICULAR WATCH BRACELET, COMPRISING A POWER SUPPLY DEVICE PROVIDED WITH AN ELECTROMECHANICAL CONVERTER

(71) Applicant: The Swatch Group Research and Development Ltd, Marin (CH)

(72) Inventors: Milan Calic, La Conversion (CH); Matthias Imboden, St-Blaise (CH); Jean-Pierre Mignot, Pontarlier (CH); Alain Jornod, Neuchâtel (CH); François Gueissaz, Cormondrèche (CH)

(73) Assignee: The Swatch Group Research and Development Ltd, Marin (CH)

( * ) Notice: Subject to any disclaimer, the term of this patent is extended or adjusted under 35 U.S.C. 154(b) by 871 days.

(21) Appl. No.: 17/331,168

(22) Filed: May 26, 2021

(65) Prior Publication Data

US 2022/0026854 A1 Jan. 27, 2022

(30) Foreign Application Priority Data

Jul. 21, 2020 (EP) .................................... 20187004

(51) Int. Cl.
*G04C 10/00* (2006.01)
*G04C 3/10* (2006.01)
*G04C 3/12* (2006.01)

(52) U.S. Cl.
CPC ............. *G04C 10/00* (2013.01); *G04C 3/101* (2013.01); *G04C 3/108* (2013.01); *G04C 3/12* (2013.01)

(58) Field of Classification Search
CPC ........ G04C 10/00; G04C 3/101; G04C 3/108; G04C 3/12

(Continued)

(56) References Cited

U.S. PATENT DOCUMENTS

2005/0036405 A1 2/2005 Born et al.
2019/0041805 A1* 2/2019 Born ........................ G04C 3/16
2020/0251962 A1* 8/2020 Liao ....................... H02K 21/22

FOREIGN PATENT DOCUMENTS

EP 0822470 A1 * 2/1998
EP 1085383 A1 * 3/2001 ................ F16F 1/10

(Continued)

OTHER PUBLICATIONS

European Search Report for EP 20187004 dated Nov. 5, 2020.

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A wearable object (42) including an electronic unit and a power supply unit formed by an electromechanical converter (6A) which includes a rotor (44) carrying first magnets (10A), a mechanical resonator (12A) provided with an inertia mass (46) capable of oscillating at a relatively high resonant frequency and carrying second magnets (20), and coils arranged so that, when the mechanical resonator is oscillating, an induced voltage is generated in these coils. The electromechanical converter is arranged so that the first magnets and the second magnets can, during a rotational drive of the rotor, interact magnetically so as to apply to the inertia mass, momentarily or temporarily, a magnetic force torque allowing to excite the mechanical resonator, in order to generate at least one oscillation of this mechanical resonator at its resonant frequency in order to generate a relatively high induced voltage allowing to recharge an accumulator.

20 Claims, 21 Drawing Sheets

(58) Field of Classification Search
USPC .......................................................... 368/204
See application file for complete search history.

(56) References Cited

FOREIGN PATENT DOCUMENTS

| | | | |
|---|---|---|---|
| EP | 1174776 | A1 | 1/2002 |
| EP | 1178372 | A1 | 2/2002 |
| EP | 1521142 | A1 | 4/2005 |

* cited by examiner

WEARABLE OBJECT, IN PARTICULAR WATCH BRACELET, COMPRISING A POWER SUPPLY DEVICE PROVIDED WITH AN ELECTROMECHANICAL CONVERTER

CROSS-REFERENCE TO RELATED APPLICATIONS

This application claims priority to European Patent Application No. 20187004.5 filed Jul. 21, 2020, the entire contents of which are incorporated herein by reference.

TECHNICAL FIELD

The invention relates to wearable objects, in particular objects wearable on the wrist such as watches, which incorporate an electronic unit and a power supply unit to power at least this electronic unit. More particularly, the invention relates to wearable electronic devices called autonomous wearable electronic devices, which are provided with a power supply unit which draws energy from an internal mechanical device, in particular from a generator associated with an internal mechanical energy source (for example a barrel whose spring is wound up automatically by a rotor or manually), or at least one sensor receiving energy from the environment of the wearable electronic device or of a user who carries this electronic device. Thus this is about energy harvesters incorporated into autonomous electronic devices.

TECHNOLOGICAL BACKGROUND

The movement of the wrist is a source of mechanical energy that can be used to power a wristwatch. This has been used for a very long time in automatic mechanical watches. More recently, the person skilled in the art have thought of using the mechanical energy of a rotor to power supply at least one electronic unit of a wristwatch of the electromechanical or electronic type. To this end, various types of electromechanical converters have been proposed. In particular, the use of electromagnetic induction has proven to be successful. Mention may be made of two known types of autonomous watches having an electronic unit. The first type is described in particular in patent application EP 822 470, in the name of Asulab. It is an electromechanical watch comprising an electromechanical generator incorporated in a geartrain of the horological movement and having two functions, namely a function of regulating its frequency of rotation and an electromechanical converter function to be able to power the regulation electronic circuit. The second type is described in particular in patent application EP 1 239 349 and WO 9 204 662, in the name of KINETRON. A particular embodiment is described in patent application EP 1 085 383, in the name of ETA SA Swiss Watch Manufacturer. In this second type, the rotor is used only to drive an electromechanical generator which power supplies an accumulator incorporated in the electronic type watch. In the case of an electromechanical horological movement, the hands are driven by an electric motor, in particular a stepping motor, which is powered by the accumulator.

The aforementioned embodiments have a factor limiting their efficiency, in particular because of energy losses due to friction in the geartrain. In addition, to obtain a sufficiently high voltage, at least one intermediate multiplier mobile and/or one complex device allowing a barrel to give back the accumulated mechanical energy by pulses are necessary.

Another approach for harvesting kinetic energy in a watch is to implement a rotor equipped with magnets in its peripheral part, with fixed coils embedded on a PCB over which the rotor magnets pass. When the rotor is driven, a voltage is then induced in the coils due to the variation of the magnetic flux. A disadvantage of this approach arises from the fact that the rotor rotates relatively slowly (typically with an average rotation speed between 1 and 5 revolutions/s), which limits the efficiency of the energy conversion because of the low induced voltages which are generated.

SUMMARY OF THE INVENTION

The aim of the invention is to provide a wearable device provided with an electronic unit and a power supply unit comprising an electromechanical converter having good efficiency, in particular by providing a relatively high voltage before any possible voltage booster.

Thus, the invention relates to a wearable object comprising an electronic unit and a power supply unit formed by an electromechanical converter comprising:

- a rotor capable of being rotated by movements that the wearable object can undergo, this rotor carrying at least a first permanent magnet;
- a mechanical resonator mounted on a support and provided with an inertia mass capable of oscillating, around an axis of oscillation, at a resonant frequency specific to this mechanical resonator; and
- an electromagnetic system formed by at least a second permanent magnet and at least one coil which are respectively carried by the inertia mass, thus partially forming this inertia mass, and by said support or an element integral with this support and which are arranged so that, when the mechanical resonator is at rest, at least part of the magnetic flux generated by the second permanent magnet passes through the coil so that when the mechanical resonator is oscillating, an induced voltage ($U_{Ind}$) is generated in this coil.

The electromechanical converter is arranged so that said at least one first permanent magnet and said at least one second permanent magnet can, during a rotational drive of the rotor, interact magnetically so as to apply to the inertia mass, momentarily or temporarily, a magnetic force torque allowing to excite the mechanical resonator, in order to generate at least one oscillation of this mechanical resonator substantially at its resonant frequency.

In an advantageous variant, the resonant frequency is substantially equal to or greater than ten Hertz ($F_{Res}$>=10 Hz), preferably between fifteen Hertz and thirty Hertz (15 Hz<=$F_{Res}$<=30 Hz).

In a main embodiment, said at least one first permanent magnet and said at least one second permanent magnet are located in the same general plane, perpendicular to the axis of oscillation of the mechanical resonator, and arranged so that their magnetic interaction is in repulsion.

In a preferred variant, when the mechanical resonator is at rest, the centre of said second permanent magnet and the centre of said coil have an angular offset therebetween, relative to the axis of oscillation of the mechanical resonator, which is non-zero and which preferably corresponds to an angular positioning of the centre of the second permanent magnet substantially at a point of inflection of the curve of the magnetic flux, generated by said at least one second permanent magnet and passing through the coil, according to the relative angular position between the second permanent magnet and the coil.

BRIEF DESCRIPTION OF THE FIGURES

The invention will be described in more detail below using the appended drawings, given by way of non-limiting examples, wherein:

FIGS. 1A to 10 show a first variant of a first embodiment of a wearable object according to the invention, FIG. 1A being without the rotor and FIG. 1B being only partially cut;

FIG. 6 is a perspective exploded view of the mechanical resonator, the rotor and the electromagnetic system of the third embodiment; while FIG. 7 shows these parts assembled;

FIG. 9 is an electrical diagram of an alternative embodiment of an electronic circuit connecting the coils of the electromagnetic system, forming the wearable object according to the invention, to an electric energy accumulator incorporated in this wearable object.

DETAILED DESCRIPTION OF THE INVENTION

Figure 1A:
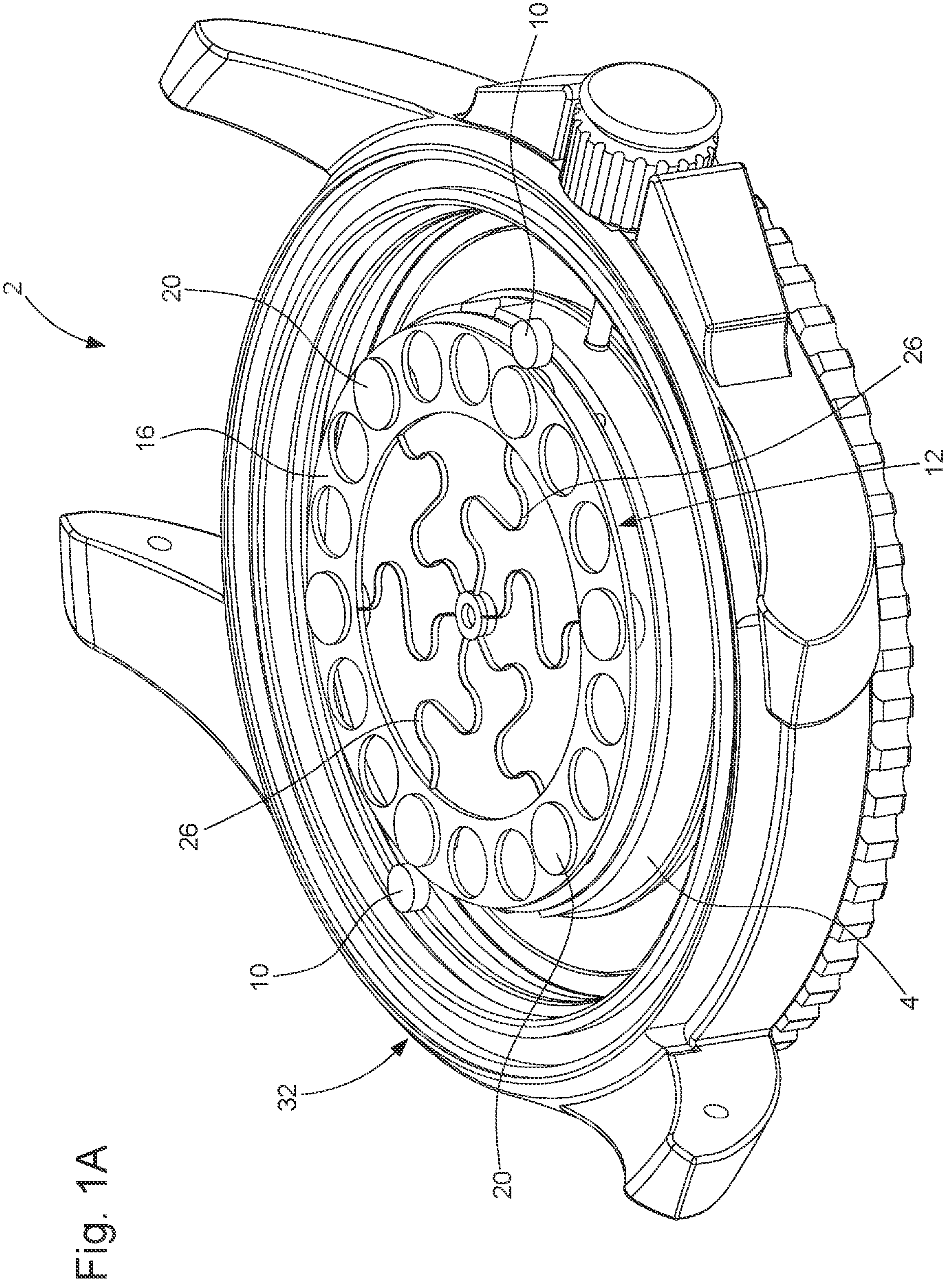
Figure 1B:
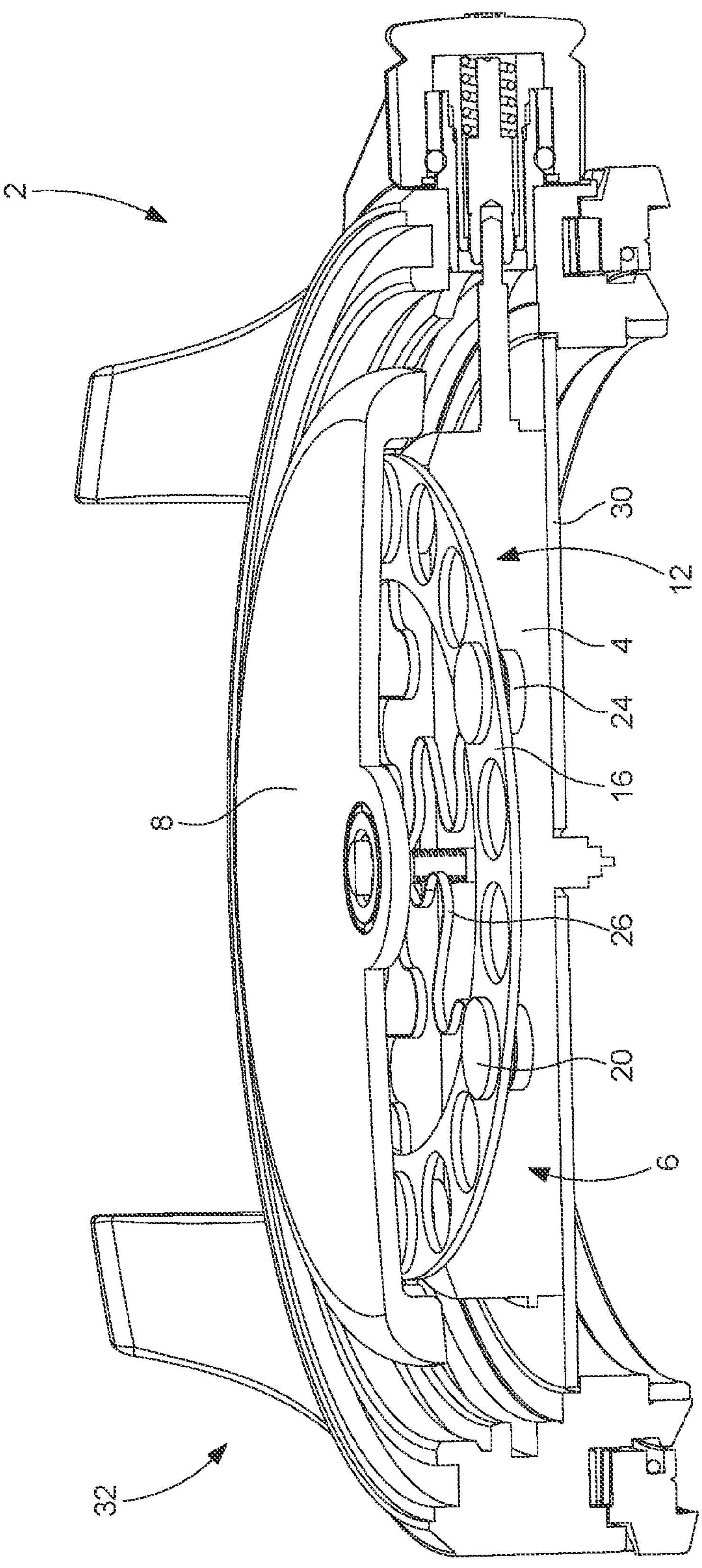
Figure 1C:
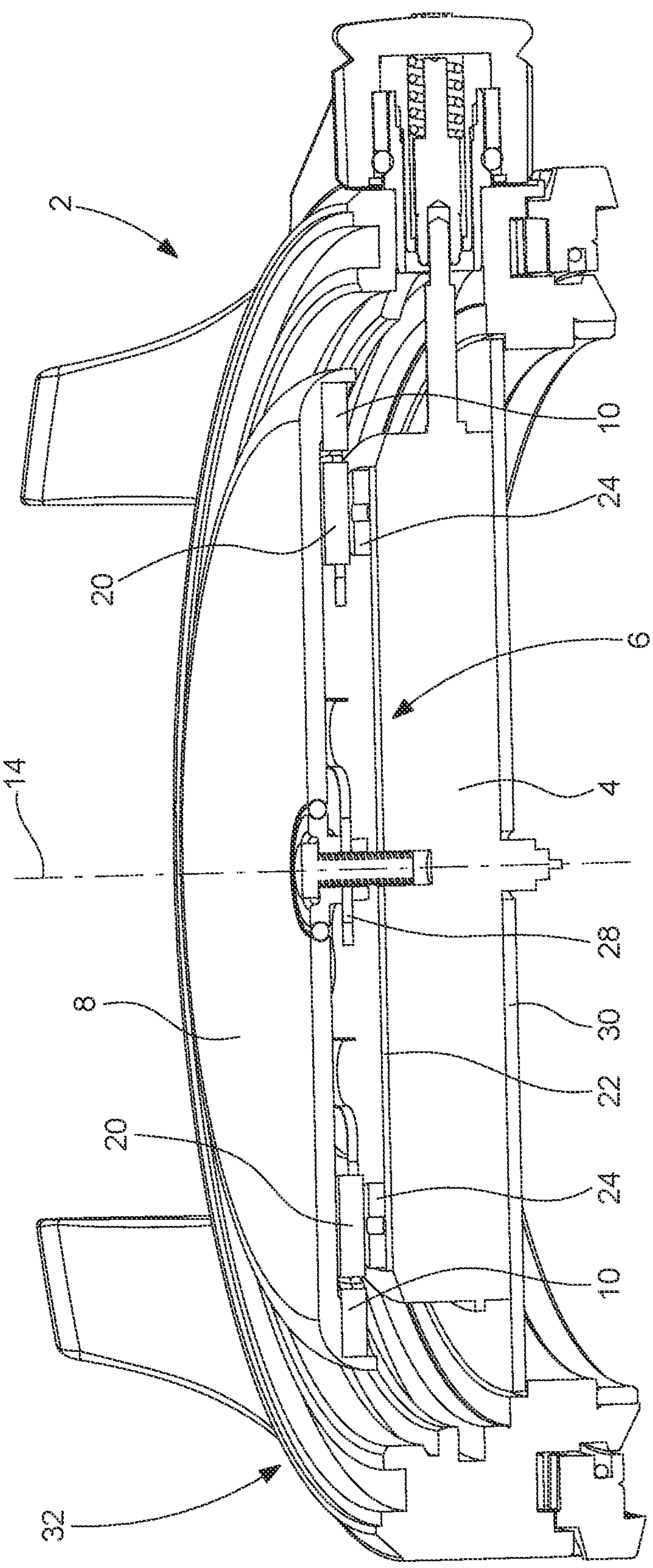

With reference to FIGS. 1A to 10, 2A and 2B, two variants of a first embodiment of a wearable object according to the invention will be described below. This wearable object is a wristwatch 2 comprising an electronic unit (incorporated in the horological movement 4) and a power supply unit. Note that the fitting circle, which connects the horological movement to the watch case, and the back of the case have not been shown in the drawings. The power supply unit is formed by an electromechanical converter 6 which converts mechanical energy from a rotor 8 into electrical energy which is stored in an electric accumulator, which powers the electronic unit. The rotor is capable of being rotated by movements that the watch may undergo, in particular when it is worn on a user's wrist.

The electromechanical converter 6 comprises:

- a rotor 8 carrying at least a first permanent magnet, in particular two magnets 10 diametrically opposed relative to the axis of rotation 14 of the rotor (case of the first variant shown);
- a mechanical resonator 12 mounted on a support (the horological movement 4) and provided with an inertia mass 16, in the shape of a ring, which is capable of oscillating, around an axis of oscillation 14 coincident with the axis of rotation of the rotor 8, at a resonant frequency $F_{Res}$ specific to this mechanical resonator,
- an electromagnetic system formed by at least a second permanent magnet 20 carried by the inertia mass 16 and partially forming the latter, in particular by six magnets 20 (case of the two variants shown), and at least one coil 24 carried by a PCB 22 integral with the horological movement 4, the number of coils being equal to the number of magnets 20 carried by the inertia mass in the case of the two variants shown.

In general, said at least one second permanent magnet 20 and said at least one coil 24 are arranged so that, when the mechanical resonator 12 is at rest, at least part of the magnetic flux generated by said second permanent magnet passes through the coil so that when the mechanical resonator is oscillating, an induced voltage ($U_{Ind}$) is generated in this coil.

The electromechanical converter 6 is arranged so that said at least one first permanent magnet and said at least one second permanent magnet can, during a rotational drive of the rotor, interact magnetically so as to apply to the inertia mass, momentarily or temporarily, a magnetic force torque allowing to excite the mechanical resonator, in order to generate at least one oscillation of this mechanical resonator substantially at its resonant frequency.

Note that, in this text, all the magnets used are permanent magnets so that they will also each be called 'magnet'. 'An oscillation' means an oscillatory movement during at least one period of oscillation and therefore having at least two vibrations. Each movement of the mechanical resonator between two extreme angular values which define its amplitude of oscillation is called 'vibration'. In a preferred variant, provision is made for at least one pair of first magnets 10 and at least one pair of second magnets 20 to interact magnetically to apply to the inertia mass the magnetic force torque which is used to activate/excite the mechanical resonator, as will be described in detail hereinafter with reference to FIGS. 4A-4F.

In a first variant, the magnets 20 and the coils 24 are arranged so that, when the mechanical resonator 12 is at rest, these magnets and these coils are respectively aligned radially, in axial projection in a general plane of the mechanical resonator, relative to the axis of oscillation 14. Preferably, in the rest position of the mechanical resonator, each magnet 20 and the corresponding coil 24 are axially aligned. In a second preferred variant, when the mechanical resonator is at rest, the centre of each second magnet 20 and the centre of the respective coil 24 have therebetween a non-zero angular offset relative to the axis of oscillation of the mechanical resonator. In particular, the angular offset provided corresponds to an angular positioning of the centre of each second magnet approximately at a point of inflection of the curve of the magnetic flux, generated by this second magnet and passing through the respective coil, according to the relative angular position between this second magnet and this coil relative to the axis of oscillation of the mechanical resonator. This preferred variant allows to significantly increase the induced voltage produced in each of the coils, in particular when the amplitude of oscillation of the mechanical resonator after each excitation of the latter is relatively small, for example of the order of a half angle at the centre of the magnets 20. Using series of measurements or simulations, the person skilled in the art will be able to determine, on the one hand, the features and dimensions of the coils and of the second magnets 20 and, on the other hand, an optimal angular offset between these second magnets and the respective coils to optimise the variation of the magnetic flux in each coil so that this variation is maximum when the inertia mass has a maximum speed, that is to say when the mechanical resonator passes through its neutral position (rest position), in order to obtain the greatest induced voltage $U_{Ind}$.

The mechanical resonator 12 is a resonator with flexible blades 26, these flexible blades carrying the inertia mass 16 and connecting the ring forming this inertia mass to a central element 28 which is fixed to the support of the mechanical resonator, that is to say it is integral with the horological movement. Schematically, in the variant shown, the central element is maintained fixed by a central screw between a projecting part of a fixed central part of the rotor 8 and a nut aimed at the central screw. This variant is given as a simplified example. The person skilled in the art will know how to design various means for fixing the mechanical resonator to the horological movement, so as to ensure in particular good stability of the central element 28. It will be noted that this central element can be connected to the horological movement 4, or to another support integral with the latter, independently of the central part of the rotor 8.

It will be noted that the rotor 8 is similar to a winding mass of an automatic mechanical movement. The rotating part of the rotor is mounted on a fixed central part by means of a ball bearing. Thus, this first embodiment has the advantage of allowing synergy in the case where the horological movement is of the mechanical type, the rotor 8 then being able to be used to activate the mechanical resonator, as will be explained later, and also to simultaneously wind a barrel of the mechanical movement. In the latter case, the electronic unit which is powered by the power supply unit according to the invention has a function other than that of displaying the current time. For example, it is a unit for communication by light or electromagnetic waves, a sensor and its electronic unit for processing sensed signals, a unit for electronic regulation of the average frequency of a balance spring incorporated in the mechanical movement, an additional digital display, etc. It will also be noted that the rotor and the mechanical resonator are arranged with their respective central axis located at the centre of the horological movement. However, in a variant, these mechanisms are arranged off-centre relative to the central axis of the horological movement.

The electromechanical converter 6 is arranged at the rear of the horological movement 4, on the side of the back of the watch case 32 and therefore on the side opposite to the dial 34 relative to the movement 4 which is here an electromechanical movement with an analogue time display. Thus, this movement comprises a motor, in particular a stepped motor.

The first embodiment is characterised in particular by the fact that the rotor 8 is mounted to rotate freely on a central part which is fixed, according to various variants, either to the fixed central element 28, or directly to the horological movement 4 or optionally to an internal device which is integral with this central element or this horological movement and which is located on the other side of the inertia mass 16 relative to the rotor, namely on the side of the analogue display in the case of the watch 2. The rotor is configured so as to have an unbalance to promote its rotation during the movements that the watch may undergo. In the first variant, the rotor has a peripheral part which extends over an angle of approximately 200° and carries the two magnets 10 in two internal cavities which open laterally inward, these two magnets coming out of the peripheral part of the rotor towards the inertia mass 16 of the mechanical resonator.

In the first embodiment, as in the other embodiments which will be described later, the first magnets 10 and the second magnets 20 are located in the same general plane which is perpendicular to the central axis 14 defining the axis of oscillation of the mechanical resonator 12 and the axis of rotation of the rotor 8, which are coincident. This feature has the purpose of preventing the occurrence of an axial force on the inertia mass of the mechanical resonator and consequently also on the rotor. Then, the first magnets 10 and the second magnets 20 are arranged so that their magnetic interaction is in repulsion. In an advantageous variant, they all have magnetisation axes substantially parallel to the central axis 14. Note that a variant with radial magnetisation axes is possible. Finally, it will be noted that provision is made of an even number of first magnets 10 and also an even number of second magnets 20, each pair of first magnets and each pair of second magnets being arranged diametrically opposed relative to the central axis 14. This feature aims at preventing the appearance of an overall radial force on the inertia mass of the mechanical resonator and therefore also on the rotor. Thanks to these various features, on the one hand, the appearance of axial magnetic forces on the inertia mass 16 of the mechanical resonator 12 which would axially stress the flexible blades 26 and, on the other hand, the appearance of an overall radial magnetic force which would radially stress these flexible blades, are avoided. Otherwise, the inertia mass could either be displaced axially or radially or else undergo a rotation around an axis perpendicular to the central axis 14, which would be detrimental to the proper operation of the electromechanical converter 6 according to the present invention. The magnetic interaction provided between the first magnets 10 and the second magnets 20 must essentially allow to generate a magnetic force torque on the inertia mass 16 of the mechanical resonator 12.

In a variant not shown, provision is made to double the inertia mass by arranging on both sides of the coils 24 a first inertia mass 16 and a second inertia mass which is similar thereto. Thus, each second magnet 20 is replaced here by a pair of second magnets having the same polarity and aligned axially with a coil 24 located between these two magnets, preferably at the same distance from each of them. Since the two magnets of each pair of magnets attract each other magnetically, it is advantageous, if not necessary, for the two magnets of each of the pairs of second magnets to be rigidly assembled. In this variant, the first magnets 10 are advantageously located in a general plane wherein the coils 24 are located. In another variant not shown, the first magnets 10 carried by the rotor are doubled so as to have pairs of first magnets of the same polarity replacing each first magnet 10 of the two variants shown. It will be noted that this last variant allows an axial arrangement of the pairs of first magnets with the second magnets, that is to say that the first magnets and the second magnets have substantially the same radius at the central axis, defining the axis of oscillation of the mechanical resonator and the axis of rotation of the rotor, without an axial magnetic force being exerted on the inertia mass. In a variant combining the two variants not shown described here, there are pairs of first magnets and pairs of second magnets. In a first case, all these pairs of magnets are located in two general planes located respectively on both sides of the general plane of the coils 24. In a second case, an axial arrangement of the pairs of first magnets with the pairs of second magnets is provided.

In an advantageous variant, the resonant frequency $F_{Res}$ is substantially equal to or greater than ten Hertz ($F_{Res}$>=10 Hz). In a preferred variant, the resonant frequency $F_{Res}$ is comprised between fifteen Hertz and thirty Hertz (15 Hz<=$F_{Res}$<=30 Hz). While the rotor generally rotates at a frequency of the order of magnitude of 1 Hz (that is to say 1 to 5 revolutions per second), the mechanical resonator oscillates at relatively high frequency and transforms kinetic energy of the rotor into oscillation mechanical energy, preferably via magnet-magnet coupling in magnetic repulsion. Since each coil is associated with a magnet of the mechanical resonator, the number of sinusoidal pulses generated in each coil is equal to twice the resonant frequency $F_{Res}$ as long as the mechanical resonator oscillates freely. By arranging the electromechanical converter so that the mechanical resonator remains activated approximately continuously as the rotor rotates at substantially constant speed within a range of usual speeds, a large number of sinusoidal induced voltage pulses can be obtained with each revolution of the rotor and thereby efficiently converting a certain part of the kinetic energy of the rotor into electrical energy which is brought into a power supply electrical accumulator.

Figure 2A:
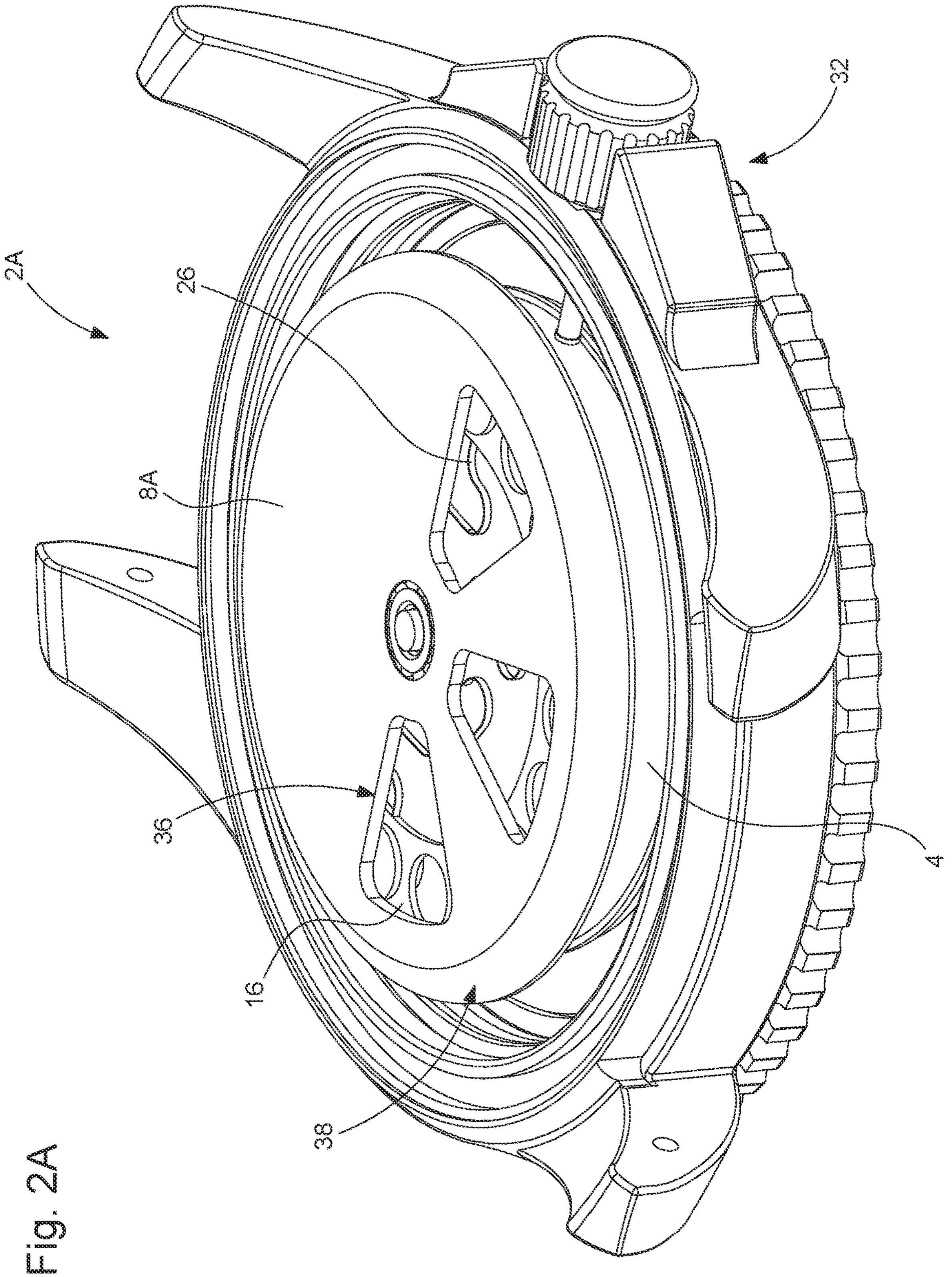
FIGS. 2A and 2B show a second variant of the first embodiment, FIG. 2B showing only the overall magnetic system provided.
Figure 2B:
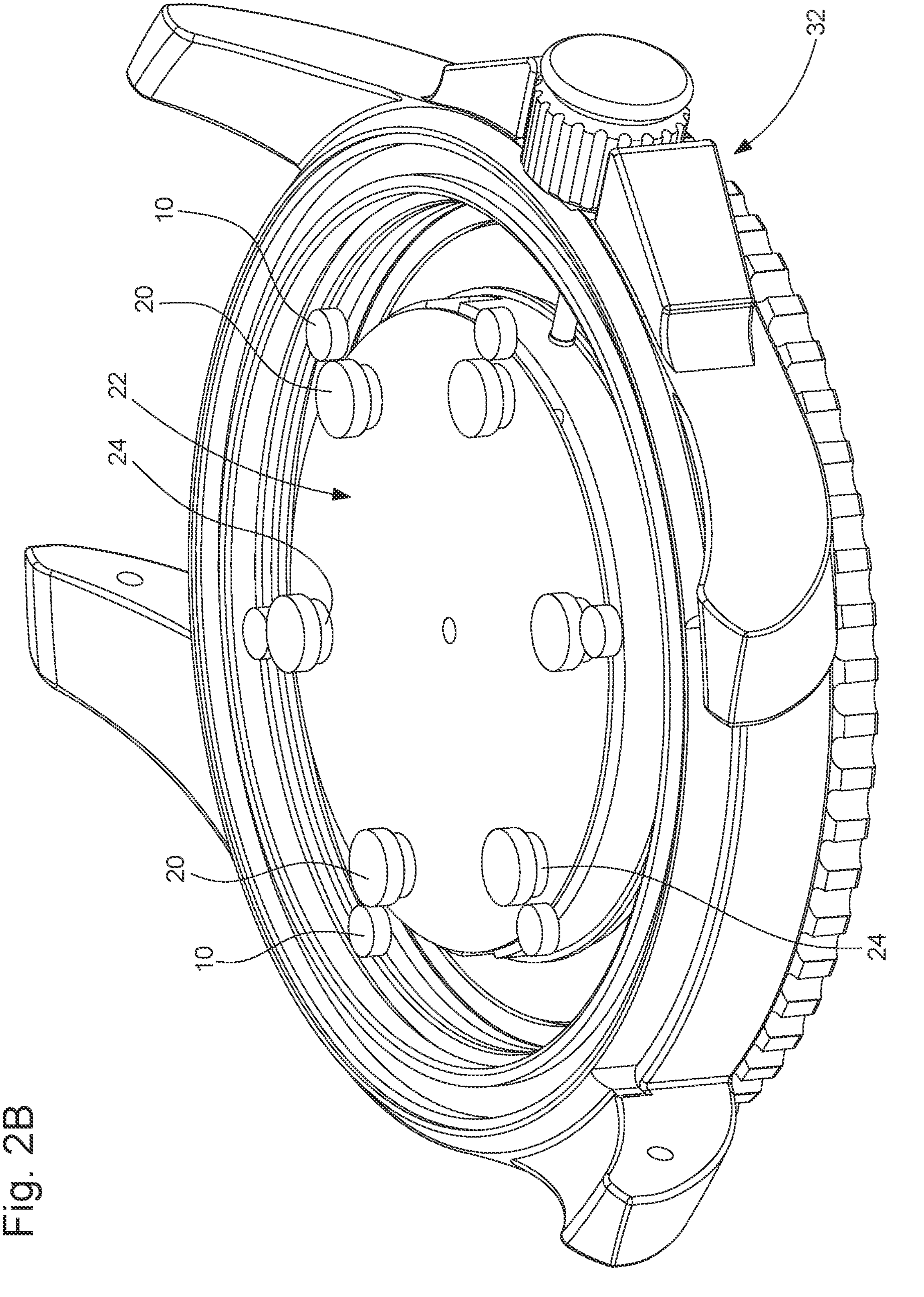

FIGS. 2A and 2B show a second alternative embodiment of a wristwatch 2A according to the first embodiment. The mechanical resonator is identical to that of the first variant. This second variant differs from the first variant by the fact that the rotor 8A carries six magnets 10, that is to say the same number as that of the magnets 20 which are carried by the inertia mass 16. Since the six magnets 10 are regularly distributed along the peripheral part 38 of the rotor, this peripheral part extends over a complete revolution (360°). The peripheral part thus forms an annular part which laterally surrounds the inertia mass 16 of the mechanical resonator. In order to keep the unbalance of the rotor, three openings 36 are machined in the rotor plate. Given that the six magnets of the inertia mass are evenly distributed, each magnet 10 has an identical magnetic coupling with the magnets 20 so that the force torques generated between each of the magnets 10 and the magnets 20 add up. FIG. 2B shows the overall magnetic system provided according to the invention, namely the magnets 10 carried by the rotor and used to activate the mechanical resonator, the magnets 20 carried by the oscillating inertia mass 16 of the mechanical resonator, and the coils 24 mounted on a PCB 22 so as to be in front of the magnets 20 when the mechanical resonator passes through its rest position.

In a specific variant, the flexible blades 26 of the mechanical resonator are made of a piezoelectric material and each coated with two electrodes through which an electric current is generated when the mechanical resonator is activated, this electric current also being provided to an accumulator comprised in the power supply unit of the watch 2 or 2A.

Figure 3A:
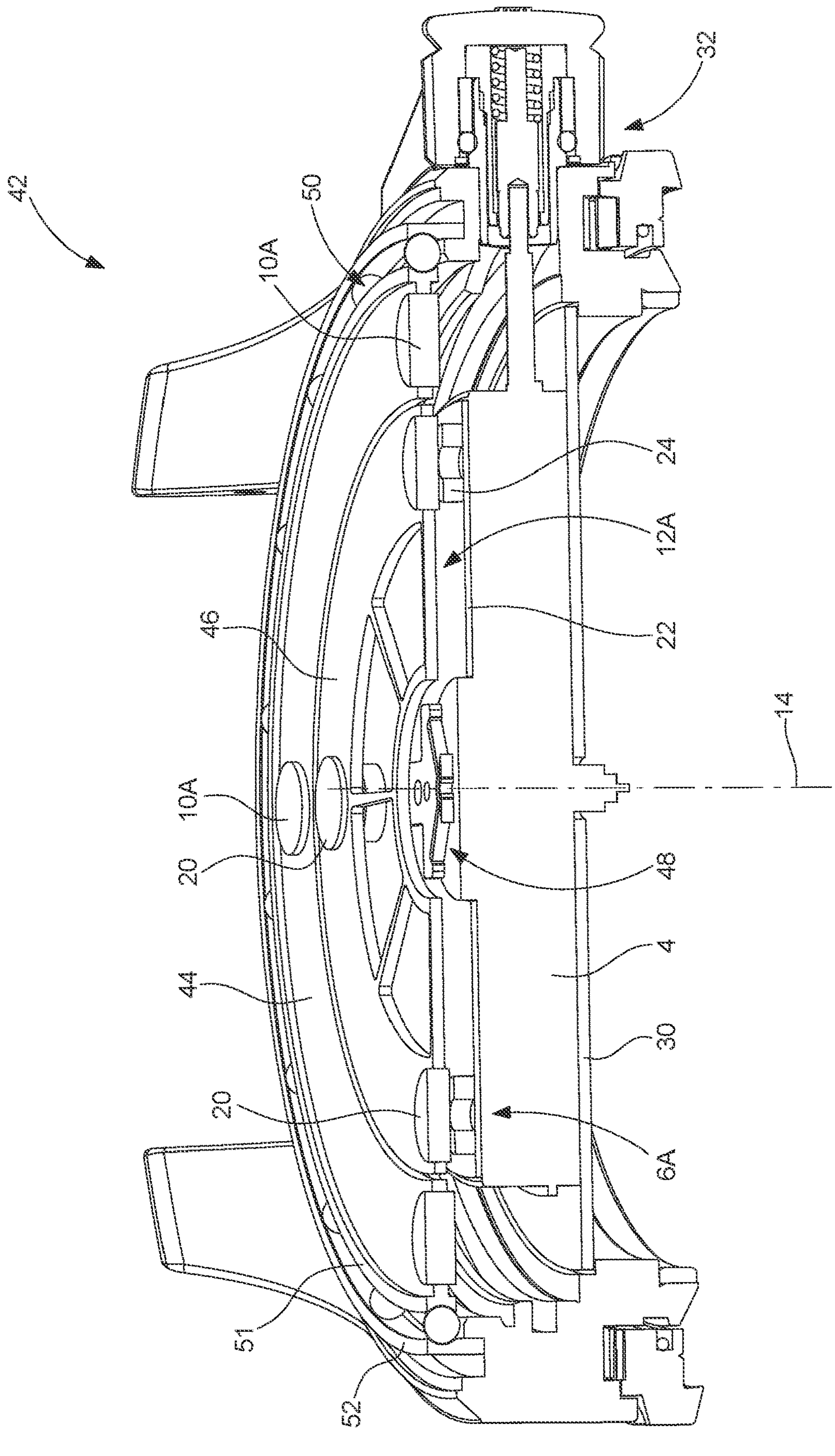
FIGS. 3A to 3C show a second embodiment of a wearable object according to the invention, FIG. 3C only partially showing the mechanical resonator.
Figure 3B:
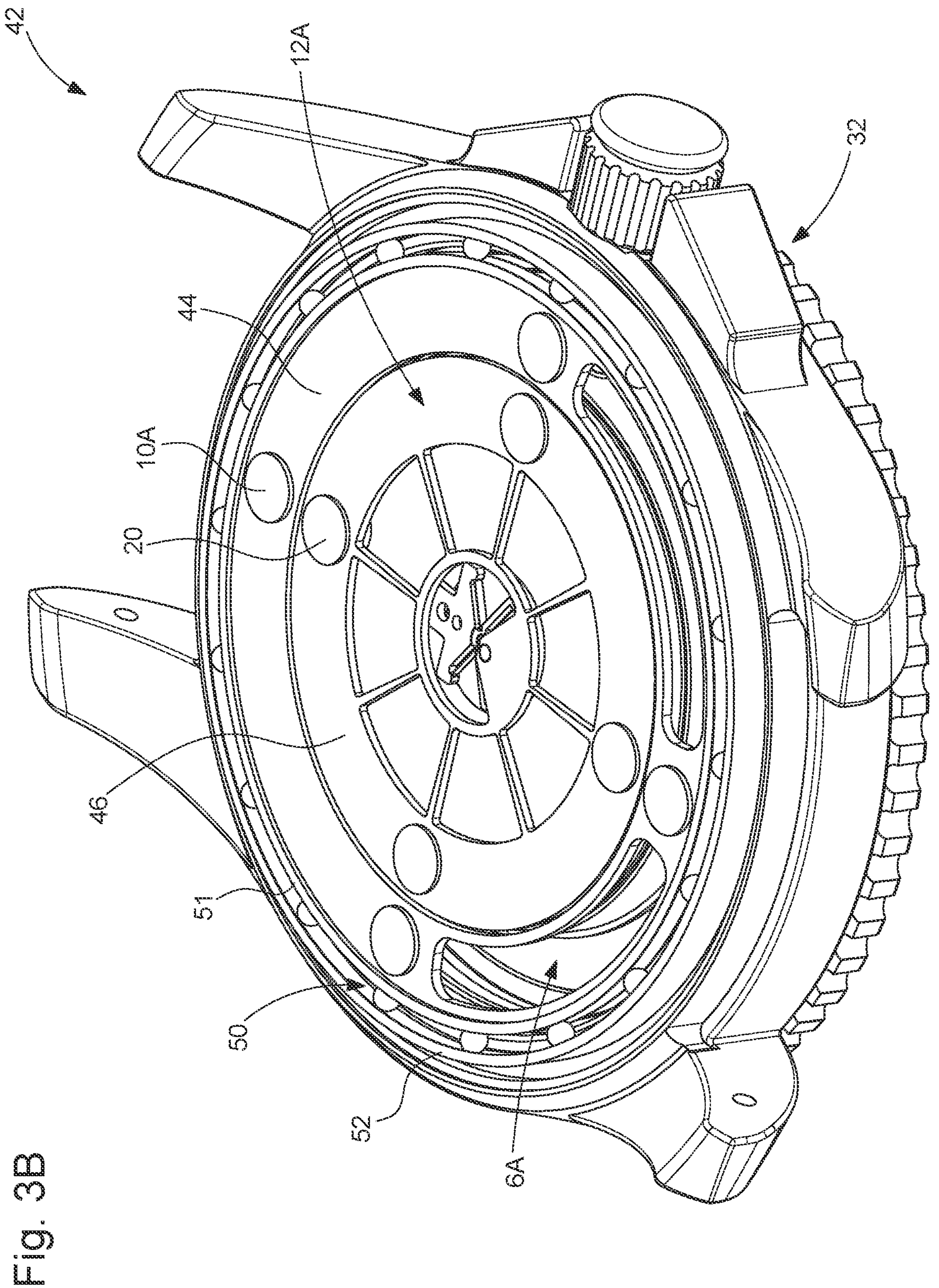
Figure 3C:
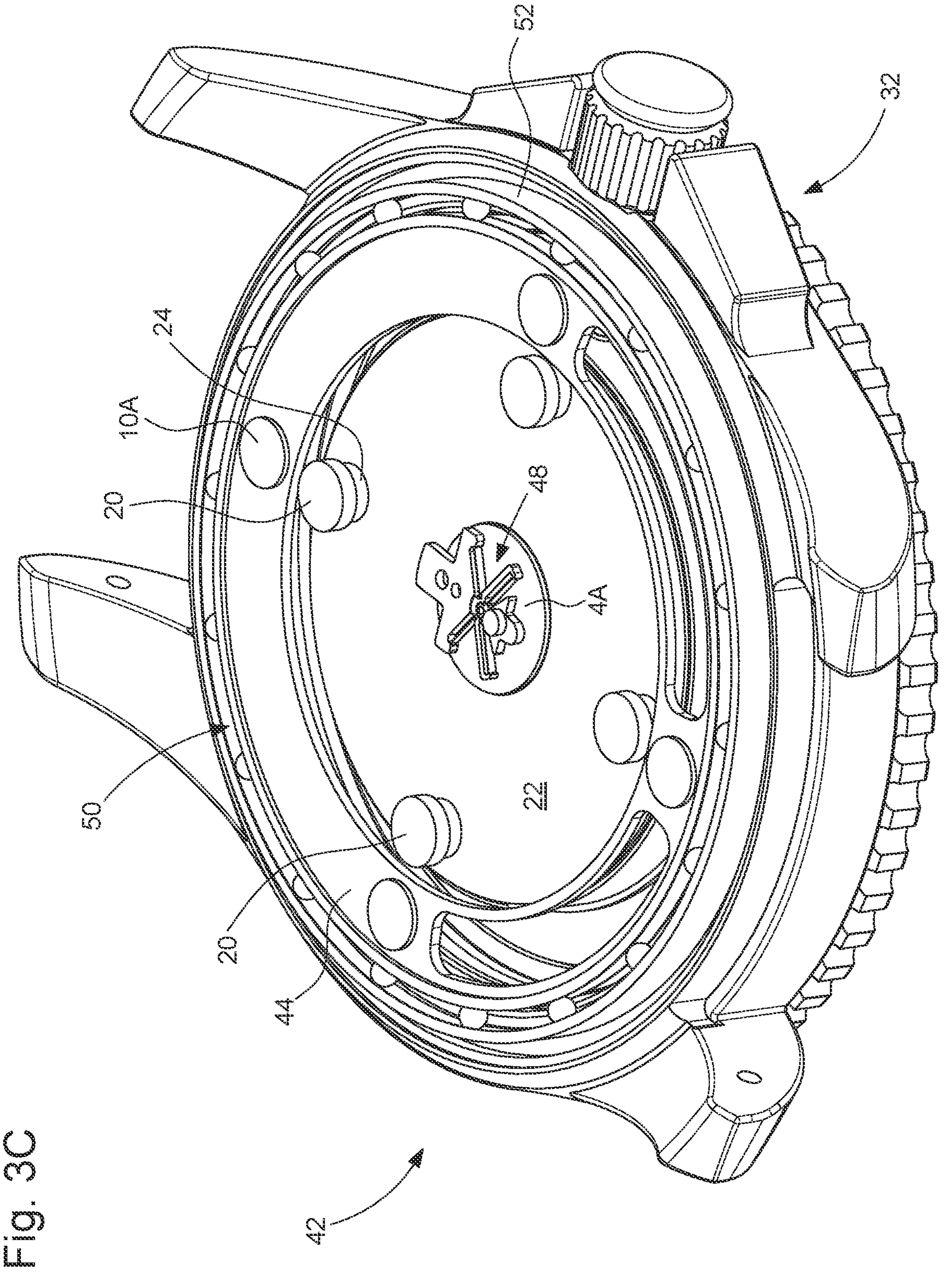

A second embodiment of a watch 42 comprising an electromechanical converter 6A according to the invention is shown in FIGS. 3A to 3C. This second embodiment differs from the first embodiment substantially by the arrangement of the rotor 44 and by the arrangement of the mechanical resonator 12A. The mechanical resonator comprises an inertia mass 46 and a resonant structure 48 mounted on a projecting part 4A of the horological movement 4. The inertia mass defines a wheel which is formed of an outer ring, similar to that provided in the first embodiment and carrying four magnets 20 distributed regularly, a central part and radial arms which connect the outer ring to this central part. The central part is firmly connected to an oscillating part of the resonant structure 48 with flexible blades which is located in a general plane lower than that of the inertia mass. The resonant structure is of a type which is described in patent application EP 3 206 089. According to two particular variants, the radial arms of the inertia mass are respectively rigid and semi-rigid. The semi-rigid variant allows to absorb sudden accelerations of the inertia mass, particularly from shocks that the watch may undergo. Four coils 24 are arranged on a PCB 22 so as to have an angular offset with the four corresponding magnets 20 when the mechanical resonator 6A is in its angular rest position, according to an advantageous variant which has been explained in the context of the first embodiment.

The rotor 44 is mounted to rotate freely on a fixed structure of the wearable object, advantageously on the middle part of the case 32 of the watch as in the variant shown or preferably on a casing ring of the horological movement 4, by means of a ball bearing 50. To free the central area of the rotor under which the resonant structure 48 is located, an internal ring 51 of the ball bearing 50 is advantageously formed by the rotor or integral with this rotor, while an outer ring 52 of this bearing is formed by said fixed structure or integral with this fixed structure. In the variant shown, the path of the bearing of the inner ring 51 is formed by an outer lateral surface of the rotor 44. Preferably, as in the variant shown, the ball bearing 50 is located at the periphery of the rotor 44.

In the specific variant shown, the rotor 44 is formed by an annular part carrying four magnets 10A and it is arranged in the same general plane as the inertia mass 46 of the mechanical resonator and as the ball bearing 50. Thus, the rotor and the mechanical resonator are advantageously coplanar in order to limit the increase in thickness of the case 32 of the watch 42 generated by the arrangement of the electromechanical converter according to the invention in this watch. In addition, this assembly is also provided here coplanar with the ball bearing. In a variant, the ball bearing is arranged under the annular part of the rotor, on the side of the horological movement 4. The magnets 10A of the rotor are of the same number as that of the magnets 20 of the inertia mass 46 of the mechanical resonator 12A. The magnets 10A and 20 are advantageously arranged in the same general plane. In the variant shown, these magnets are inserted into respective openings of the annular part of the rotor and of the inertia mass, so that they are arranged in the general plane wherein this annular part and this inertia mass extend. As in the first embodiment described above, the magnets 10A and 20 have axial magnetisation axes and a repulsive magnetic interaction. The magnets 10A, respectively 20 are arranged in diametrically opposed pairs. Thus, the inertia mass undergoes only a magnetic force torque in the general plane wherein the magnets 10A and 20 are arranged (in other words, the vector of this magnetic torque is axial, coincident with the axis of oscillation 14 of the mechanical resonator 12A). It will also be noted that the annular part of the rotor 44 has two openings allowing to generate an unbalance.

With reference to FIGS. 4A to 4F, the operation of the electromechanical converter of the second embodiment and more particularly the activation of the mechanical resonator 12A by the rotor 44 will be described more precisely. In these figures, the rotor is represented only by the magnets 10A. In the particular example discussed here, the rotor is expected to rotate in the counter-clockwise direction at a substantially continuous speed of one revolution per second (1 Hz). Note that the electromechanical converter of the first embodiment operates similarly to the electromechanical converter of the second embodiment.

Figure 4A:
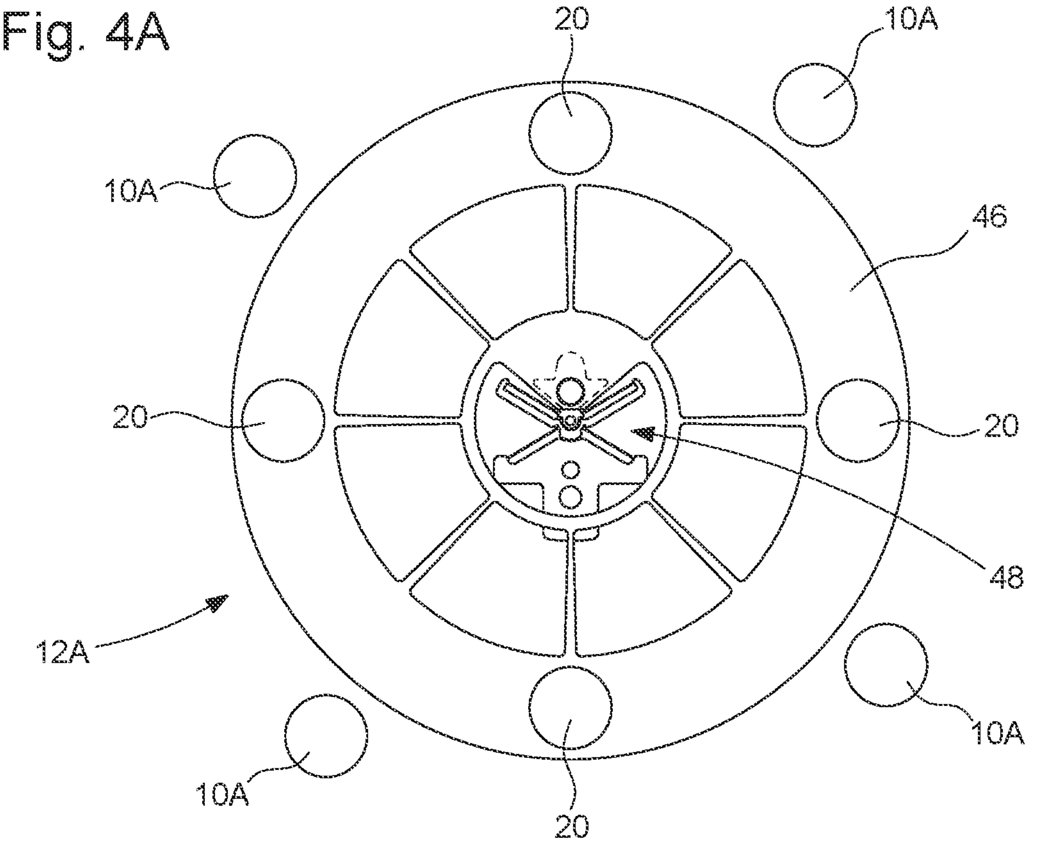
FIGS. 4A to 4F show the operation of the electromechanical converter of the second embodiment by a succession of instantaneous positions of the rotating rotor and of the mechanical resonator activated by this rotating rotor.
Figure 4B:
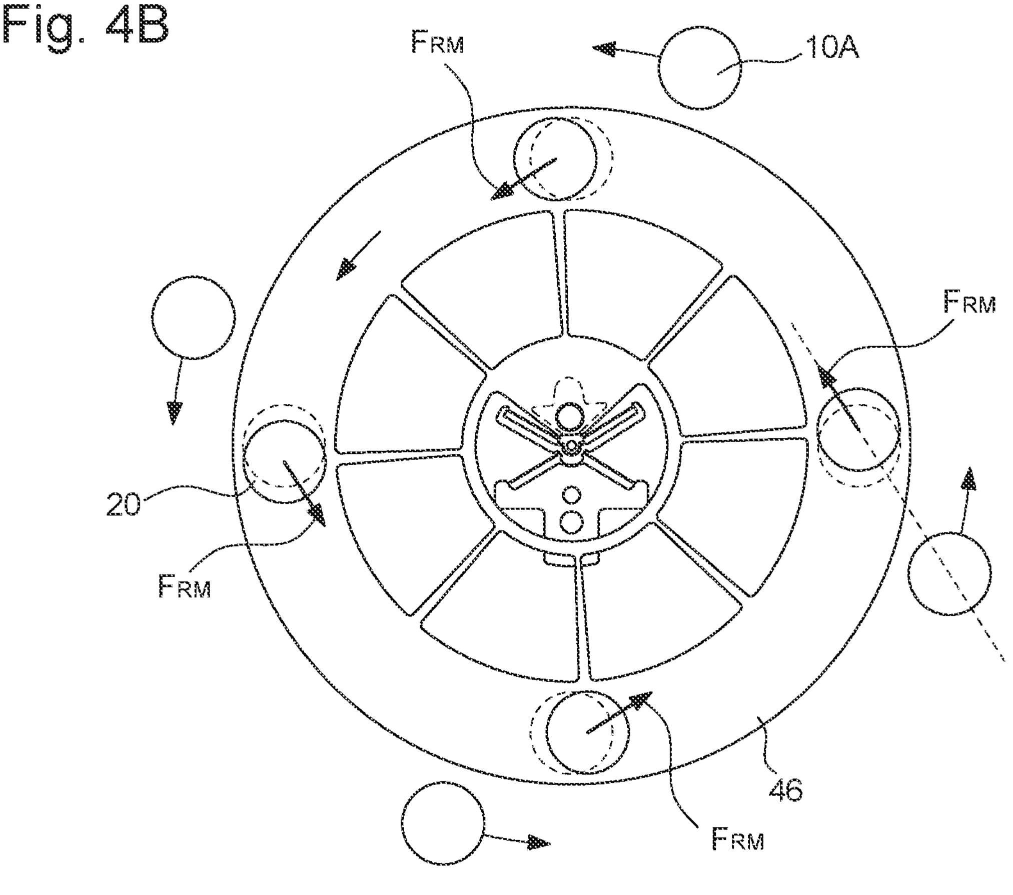
Figure 4C:
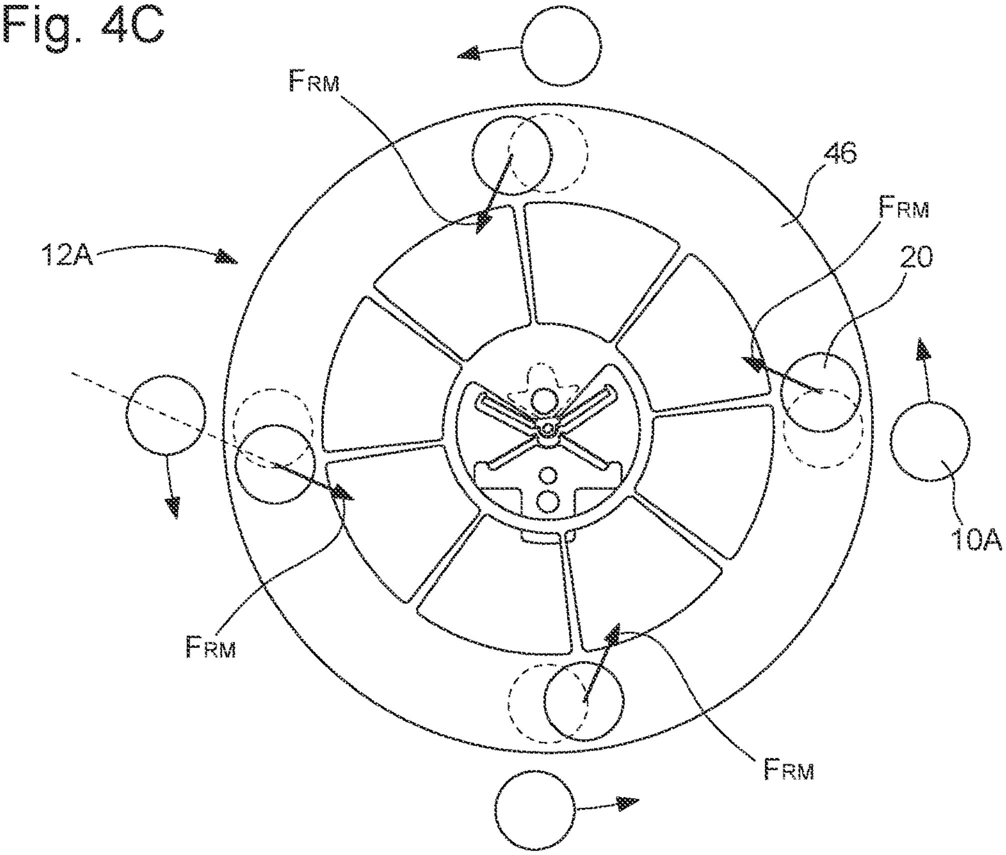

In FIG. 4A, the rotor is substantially stationary and the mechanical resonator 12A is stopped in its rest position. From this initial position of the electromechanical converter, the rotor with its magnets 10A rotate in the counter-clockwise direction at a substantially constant speed, after an initial acceleration resulting for example from a sudden movement of the arm of a user of the watch 42. In FIG. 4B, the four magnets 10A of the rotor have approached the four magnets 20 of the mechanical resonator. A magnetic interaction takes place between each magnet 10A and a corresponding magnet 20. A magnetic repulsion force FRM is then exerted on each of the magnets 20 and a first strong magnetic coupling takes place. It will be noted that the radial components of the four forces FRM cancel each other out by pair of diametrically opposed magnets, while the tangential components of these forces FRM add up and generate a magnetic force torque applied to the inertia mass 46 of the mechanical resonator, this magnetic force torque rotating the inertia mass 46 so that the magnets 20 carried by this inertia mass undergo angular displacement departing from the rest position of the mechanical resonator, as made visible by the circles in dotted lines indicating, in FIGS. 4B to 4F, the angular rest position of the magnets 20 and also the angular position of each of the four coils 24 of the electromechanical converter 6A. The magnetic repulsion force FRM further increases in intensity as the magnets 10A move even closer to the respective magnets 20, but it is mainly the radial component that increases so that the magnetic force torque acting on the inertia mass passes through a maximum for a relative angular position of the magnets 10A and the magnets 20 which is shown in FIG. 4C.

Figure 4D:
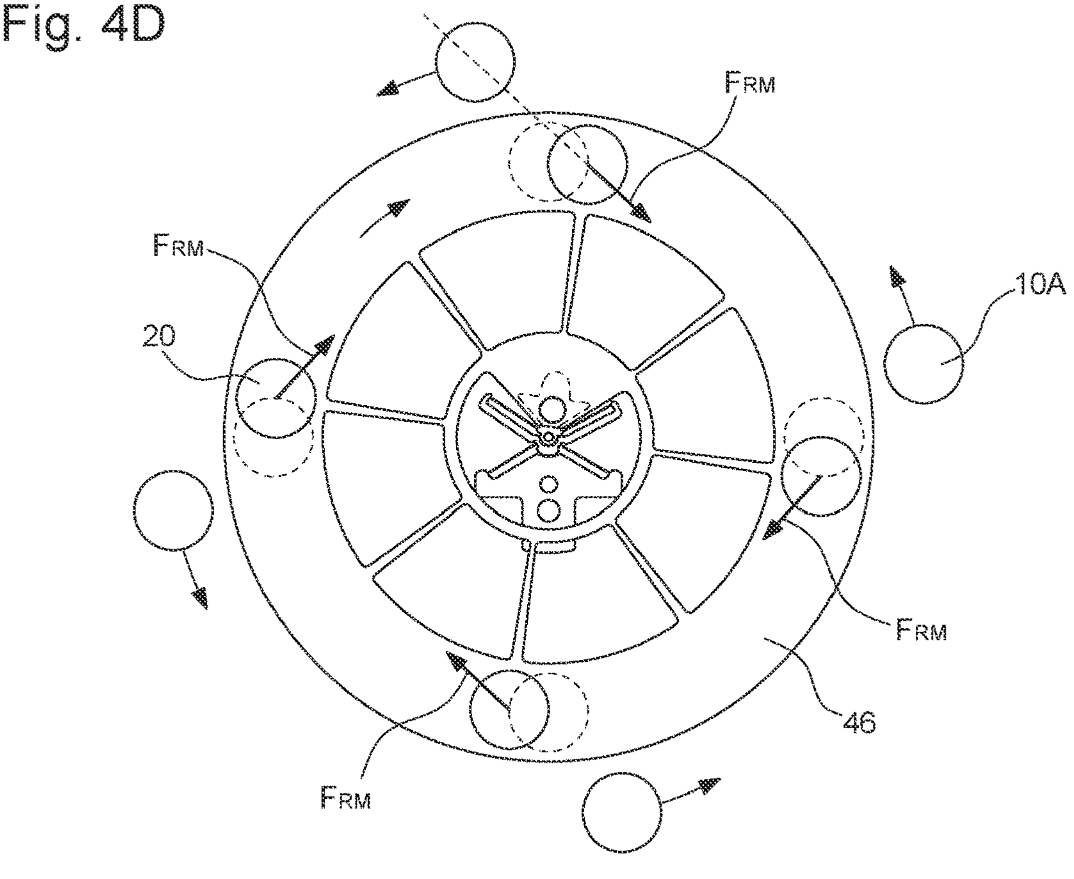
Figure 4E:
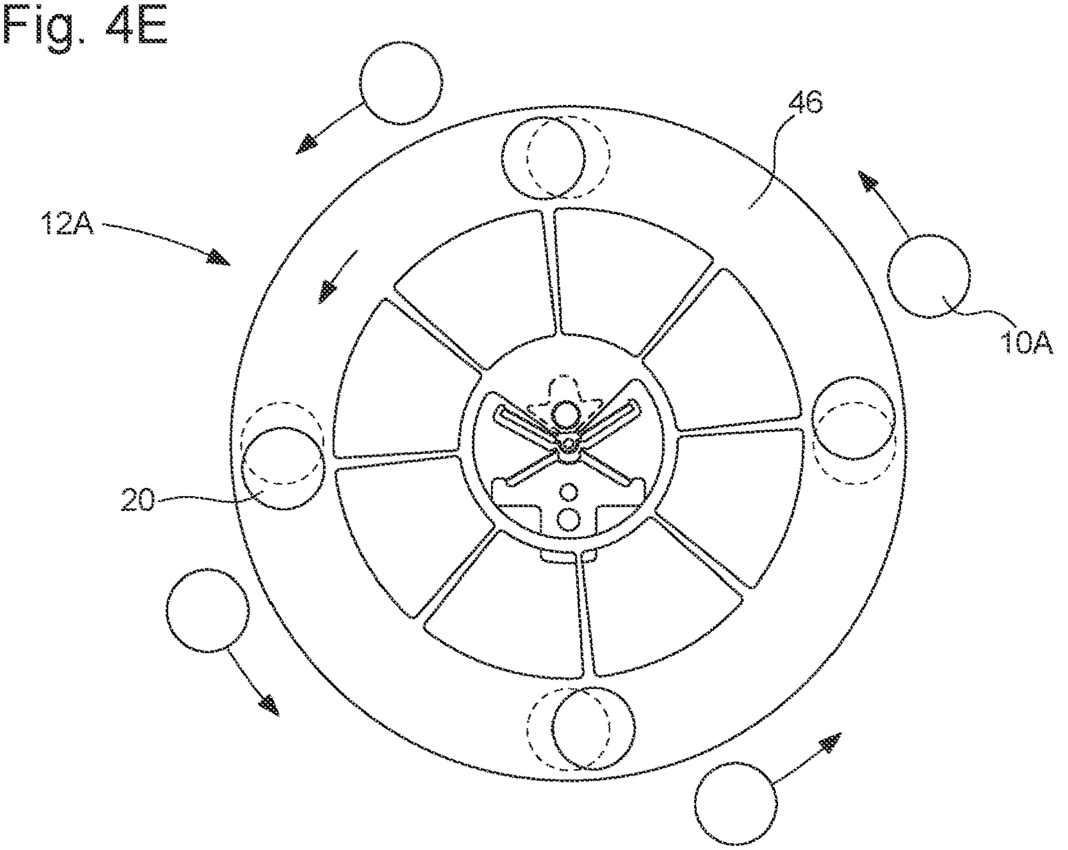
Figure 4F:
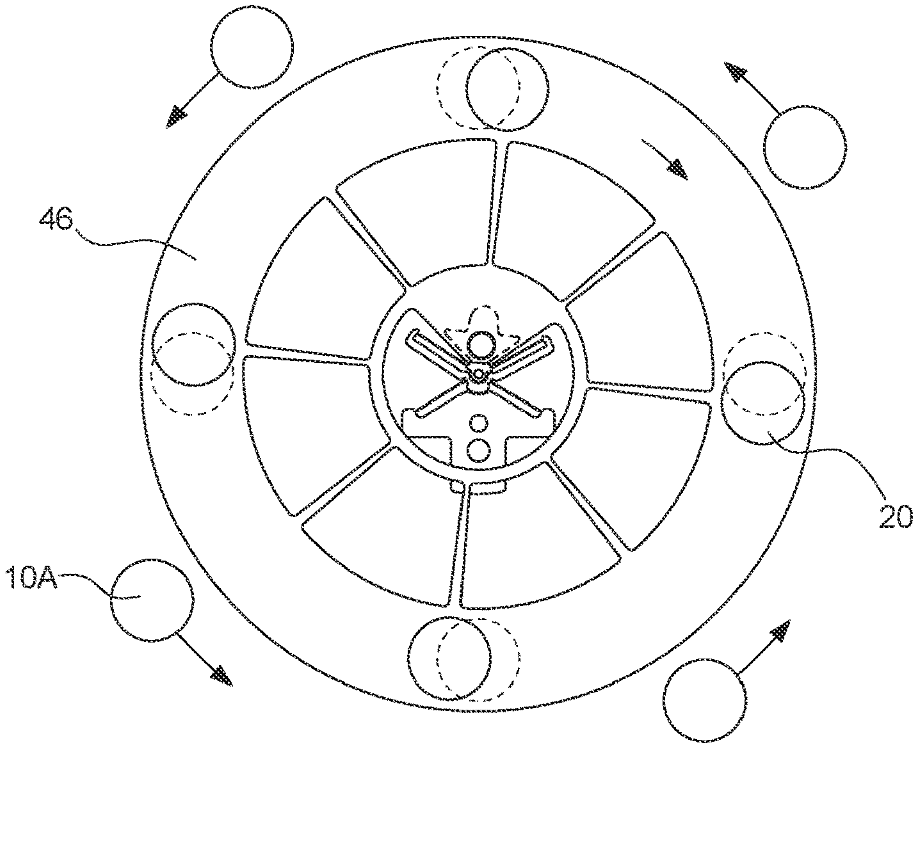
Figure 5A:
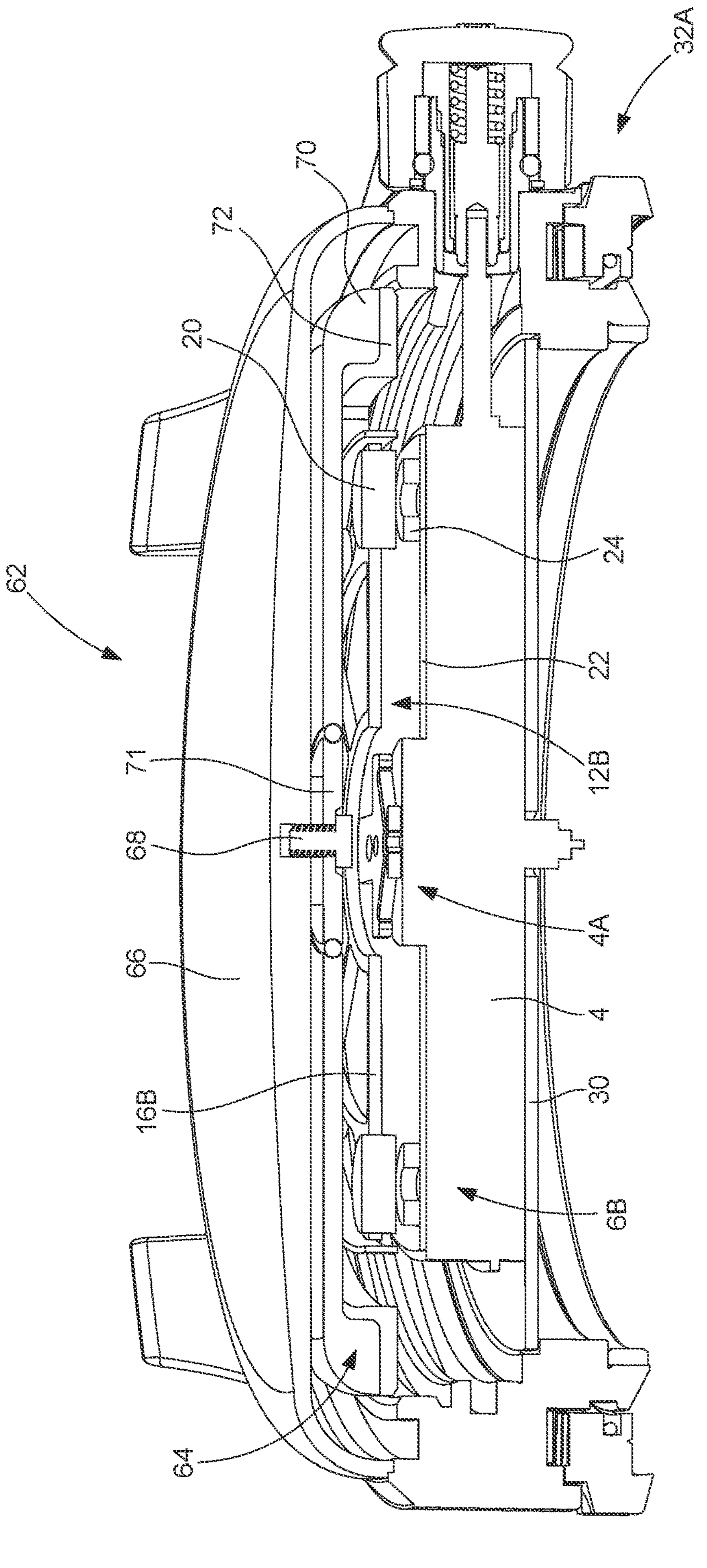
FIGS. 5A to 5C show a third embodiment of a wearable object according to the invention.
Figure 5B:
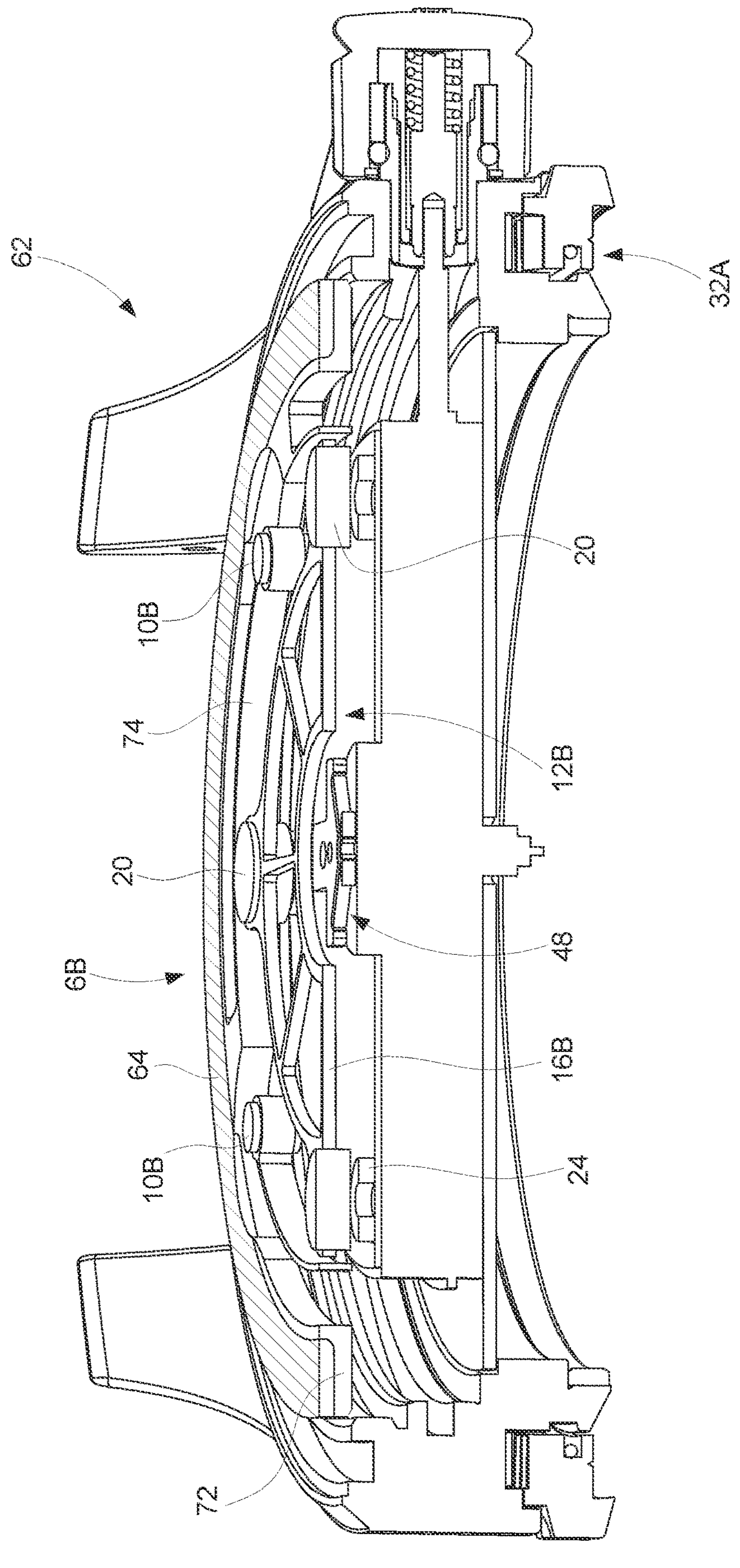
Figure 5C:
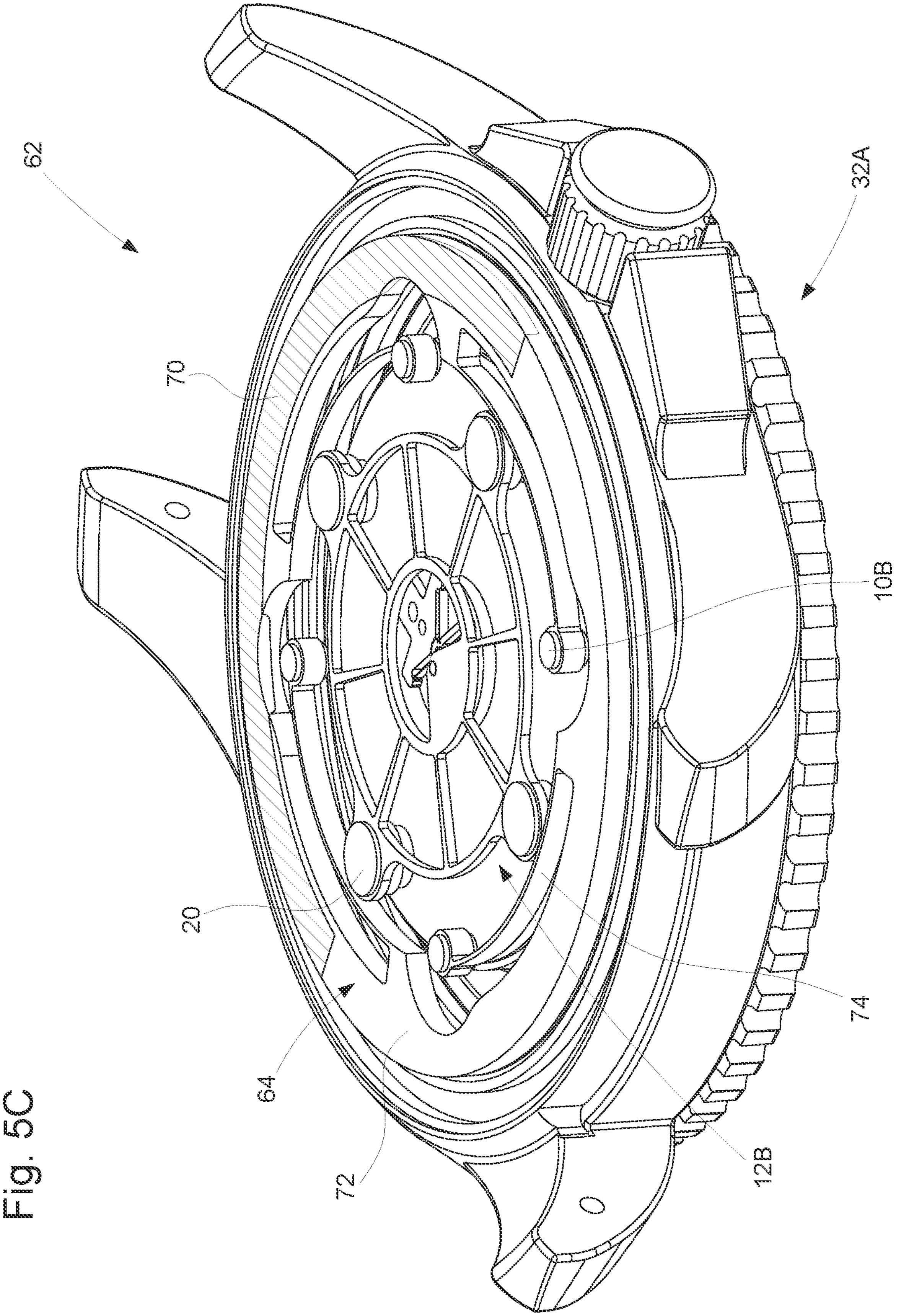
Figure 6:
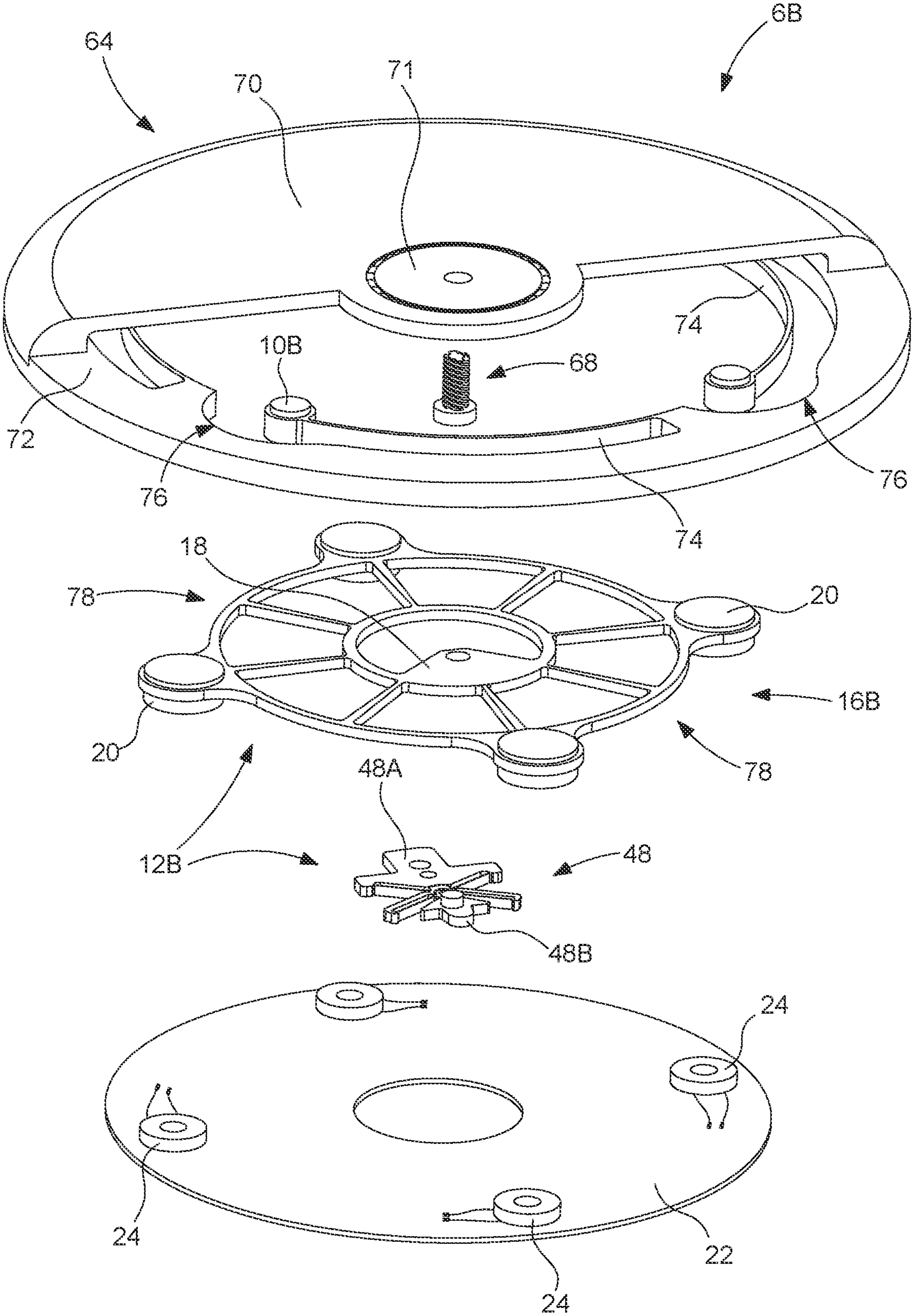
Figure 7:
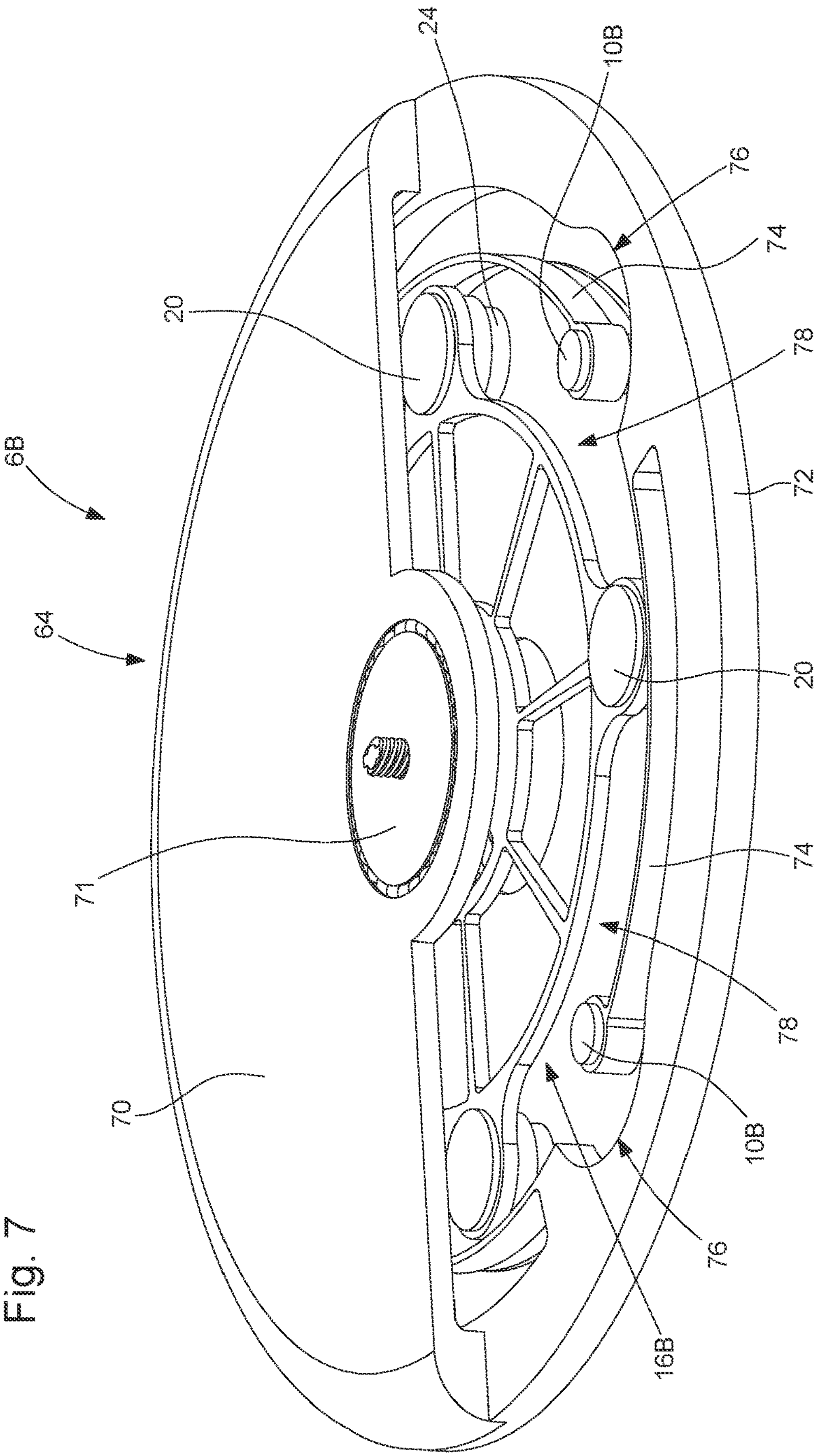

Once the elastic return torque of the mechanical resonator is equal to the magnetic force torque and insofar as the latter increases more strongly than the magnetic force torque in the event that the latter continues to increase, an oscillation of the mechanical resonator begins thanks to the elastic return torque of the mechanical resonator which drives the inertia mass in the direction opposite to that of the rotor, as shown in FIG. 4D. What is remarkable in the magnetic coupling between the rotor and the inertia mass of the mechanical resonator comes from the fact that not only does it exert an initial magnetic force torque in the direction of rotation of the rotor, generating an initial movement of the inertia mass allowing it to be moved away from its rest position to then allow oscillation at the resonant frequency, but this magnetic coupling then exerts, as soon as the magnets 10A angularly exceed the corresponding magnets 20 to which they are substantially coupled during said initial movement, a magnetic force torque of opposite direction which gives energy to the inertia mass in the first vibration of its oscillation following the aforementioned angular exceeding and which allows to amplify the oscillation of the inertia mass at the resonant frequency $F_{Res}$. FIGS. 4E and 4F show two instantaneous positions of the electromechanical converter during two vibrations following the first vibration shown in FIG. 4D. Thus, given the relatively high resonant frequency $F_{Res}$, for example 20 Hz in the example discussed, several vibrations can occur substantially at this resonant frequency before the magnets 10A of the rotor are again strongly coupled with the magnets 20 of the inertia mass, each magnet 10A then being substantially magnetically coupled with a following magnet 20 (in the direction of rotation of the rotor) of the inertia mass during this new strong magnetic coupling.

The new strong magnetic coupling can generate various magnetic interaction variations and thus act under various scenarios on the mechanical resonator. These various scenarios depend in particular on the fact that the mechanical resonator rotates in the same direction of rotation as the rotor at the start of a new strong magnetic coupling or, on the contrary, that the respective rotations of the rotor and of the mechanical resonator are then in opposite directions. In the first case, the new strong magnetic coupling will mainly be used to maintain the first oscillation generated during the first strong magnetic torque. In the second case, firstly, the new strong magnetic coupling slows down the inertia mass and therefore substantially dampens the first oscillation, then secondly generates a second oscillation, mainly by the magnetic force torque in the opposite direction to that of the rotor which intervenes after the magnets of the rotor have angularly exceeded those of the inertia mass. It will be noted that due to the fact that the resonant frequency is relatively high, the second case is predominant. Moreover, even if the first case can be predominant in some situations, the inertia mass often goes through a short time of stopping or of near immobility (not necessarily in the rest position, because also possible in other angular positions and in particular close to an extreme angular position of the oscillating mechanical resonator) generating a time phase shift in the oscillatory movement of the mechanical resonator. Thus, the distinction between sustained oscillation and succession of oscillations is not clear. When the mechanical resonator stops for a certain time interval in its rest position, this is about two successive oscillations, and in the opposite case this is then about maintaining an oscillation in progress, often with the introduction of a time phase shift. In any case, a plurality of successive momentary oscillations substantially at the resonant frequency $F_{Res}$ can be observed between the successive strong magnetic couplings.

In a main variant, the electromechanical converter is arranged so that the magnetic force torque applied to the inertia mass by the rotor allows to generate, during a rotational drive of the rotor over an angular distance greater than the angle at the centre between two adjacent magnets 20 of the mechanical resonator, a plurality of successive momentary oscillations, at the resonant frequency $F_{Res}$ and with an amplitude substantially equal to or greater than a minimum amplitude for which the voltage induced in each coil of the magnetic system, associated with the mechanical resonator, is substantially equal to a predetermined threshold voltage, this plurality of successive momentary oscillations occurring following a plurality of respective momentary rotational drives of the inertia mass of the mechanical resonator by the rotor allowing to respectively generate the plurality of successive momentary oscillations.

For example, each coil 24 has a diameter of 4 mm, a height of 0.4 mm, 2300 revolutions and a resistance of 2.6 kΩ. Each coil is fixedly arranged at an axial distance of 0.1 to 0.2 mm under the respective magnets 20 of the mechanical resonator, which are selected with a strong remanent magnetisation and have a diameter approximately identical to that of the coils. By selecting a mechanical resonator having a resonant frequency $F_{Res}$ approximately equal to 20 Hz and having an average amplitude between 7° and 10° when it is activated by the rotor rotating with a usual angular frequency, the magnetic system described here, associated with the mechanical resonator, can generate an average power of the order of 2 μW per coil on a load adapted in impedance and an average induced voltage of the order of 100 mV per coil. Note that higher performances are possible.

Figure 9:
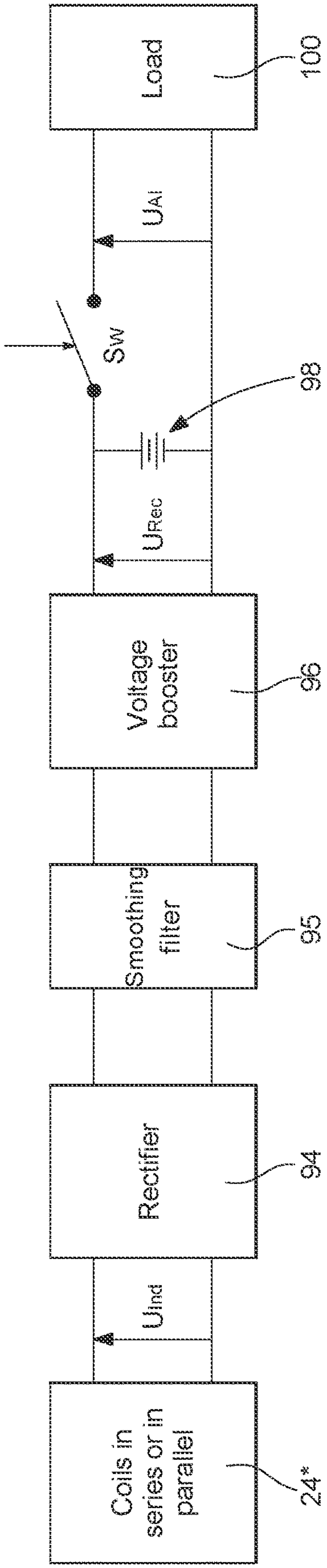

FIG. 9 is an electrical diagram of an alternative embodiment of an electronic circuit of the electromechanical converter connecting the coils, referenced 24*, of the electromagnetic system to an electric energy accumulator 98 incorporated in the wearable object according to the invention. All the coils, generally of even number and connected in parallel or in series, are connected to a rectifier 94 to which this assembly provides an induced voltage $U_{Ind}$. The induced voltage signal is then provided to a smoothing filter 95 and a voltage booster 96 (which are optional) to generate a recharge voltage $U_{Rec}$ of the accumulator 98. The accumulator provides a power supply voltage $U_{AI}$ to a load 100 incorporated in the considered wearable object. Other specific electronic units can be provided, in particular to guarantee a value of the power supply voltage $U_{AI}$ within a useful range and to ensure a certain stability of this voltage. A switch $S_W$ is provided to be able to activate or not the power supply of the load, upon request and/or depending on other electrical parameters, in particular the voltage level of the accumulator 98.

With reference to FIGS. 5A to 8H, a third embodiment of a wristwatch 62 provided with an electromechanical converter 6B according to the invention will also be described. Several elements similar to those already described above will not be described again here in detail. It will be noted that the mechanical resonator 12B is essentially identical to the mechanical resonator 12A already described. Its operation is similar. Only the external profile of the inertia mass 16B is different, in connection with the specific character of this third embodiment which differs from the previous embodiment essentially by the arrangement of the rotor 66 allowing greater efficiency to activate the mechanical resonator 12B, and by fixing the rotor directly to the case 32A given the presence of the resonant structure 48 located at the centre of the mechanical resonator. This fixing of the rotor to the back of the case constitutes an alternative to the system proposed in the context of the second embodiment, a system which can also be provided here as a variant.

The horological movement 4 bears on its rear projecting part 4A, inserted in an opening of the PCB 22 carrying four coils 24, the resonant structure 48, the part 48A of which is fixed to this rear projecting part. The resonant structure further comprises an oscillating part 48B which is connected to the fixed part 48A by a flexible blade system located in the same general plane and defining an axis of oscillation for this oscillating part and for the inertia mass 16B which is fixed to the latter via a stud which is inserted into a corresponding hole arranged in a central element 18 of this inertia mass. The inertia mass 16B carries in its peripheral part four circular magnets 20 which are inserted into holes of four respective projecting parts between which are provided four free angular areas 78 opening out laterally on the space outside the inertia mass and extending radially to a radius corresponding to that of a geometric circle wherein the inertia mass 16B is inscribed. The rotor 64 is formed of three parts, a fixed central part 71, a half-disc 70 having a more massive peripheral part, and an annular structure 72 which is rigidly fixed to this peripheral part. The half-disc 70 is mounted to rotate freely on the central part 71 by means of a ball bearing.

In the variant shown for the third embodiment, provision is made for the central part 71 to be fixed to the back 66 of the case 32A by a screw 68. Other fixing means can be considered, in particular welding or gluing. Thus, the rotor 64 is mounted on the inner side of the back 66 before assembling this assembly with the middle part of the case. According to a main feature of this third embodiment, the annular structure 72 carries four magnets 10B so as to allow them to undergo a radial elastic movement in order to be able to retract when these magnets arrive in angular areas occupied respectively by the magnets 20 of the inertia mass, these occupied angular areas separating the free angular areas 78. Indeed, for a reason which will be explained later in more detail using FIGS. 8A to 8H, the magnets 10B are arranged so that, in a neutral position wherein they are not subjected to any radial elastic force, they penetrate at least partially in the free angular areas 78. It is however provided that the magnets 10B have a radius at the central axis which is greater than the radius at this central axis of the magnets 20 of the mechanical resonator, in order to allow the operation provided for this third embodiment described below.

In the advantageous variant shown, the cylindrical magnets 10B are inserted into rings fixed to the free ends of the respective flexible blades 74. Each flexible blade 74 has a circular arc-shaped longitudinal axis centred on the axis of rotation of the rotor 64 which coincides with the axis of oscillation of the inertia mass. Thus, each flexible blade has great flexibility in the radial direction but relatively great rigidity in the angular/tangential direction. The flexible blades advantageously have a height greater than their width, so as to have sufficient axial rigidity to remain in the general plane of the magnets 20 of the mechanical resonator also during the interactions between the magnets 10B and 20 which can generate a certain axial magnetic force given the manufacturing tolerances. Cavities 76 are provided in the annular structure to allow each first assembly, formed of a magnet 10B and the ring for fixing to the flexible blade 74, to undergo a radial movement over a sufficient distance to bypass each second assembly, formed by a magnet 20 and the projecting part of the inertia mass used for fixing this magnet, when the rotor is rotated.

In general, each magnet of the inertia mass is arranged so as to project from this inertia mass, so that the inertia mass has first and a second free angular areas, respectively on both sides of this magnet, wherein each magnet of the rotor can move. Then, each magnet of the rotor is arranged so as to be able to undergo a radial elastic movement relative to the axis of oscillation of the mechanical resonator, under the action of a radial magnetic force which is generated by the interaction in magnetic repulsion with a magnet of the inertia mass, when this magnet of the rotor is located near the concerned magnet with the inertia mass. Preferably, the minimum mechanical energy position of each first magnet of the rotor, considered at its centre relative to the axis of rotation of the rotor, corresponds to a radial position of this first magnet located in a range of radial positions, relative to the axis of rotation of the rotor which coincides with the axis of oscillation of the inertia mass, corresponding to the free angular areas located between the second magnets of the inertia mass. The radial elastic movement of each first magnet of the rotor is provided so that this first magnet can retract sufficiently, when it passes through the angular position of a second magnet of the mechanical resonator, to be able to switch from the first free angular area to the second free angular area relating to this second magnet. In an advantageous variant, each first magnet of the rotor is fixed to the end of a corresponding elastic blade which is arranged so as to have a mainly tangential longitudinal axis and a capacity for elastic deformation essentially in a radial direction, relative to the axis of oscillation of the mechanical resonator.

In a preferred variant, the radial elastic movement of each of the first magnets of the rotor, under the action of the radial magnetic force, is provided with an amplitude sufficient to avoid a shock between the rotor and the inertia mass of the mechanical resonator during the passage of a first magnet through the angular position of a second magnet. In addition, the free angular areas 78, separating the angular areas occupied by the second magnets from the inertia mass, are provided so that the first magnets of the rotor do not abut against the inertia mass following a passage of these first magnets by the respective angular positions of the second magnets, so as not to disturb the oscillatory movement of the inertia mass at the resonant frequency $F_{Res}$ following this passage.

Figure 8A:
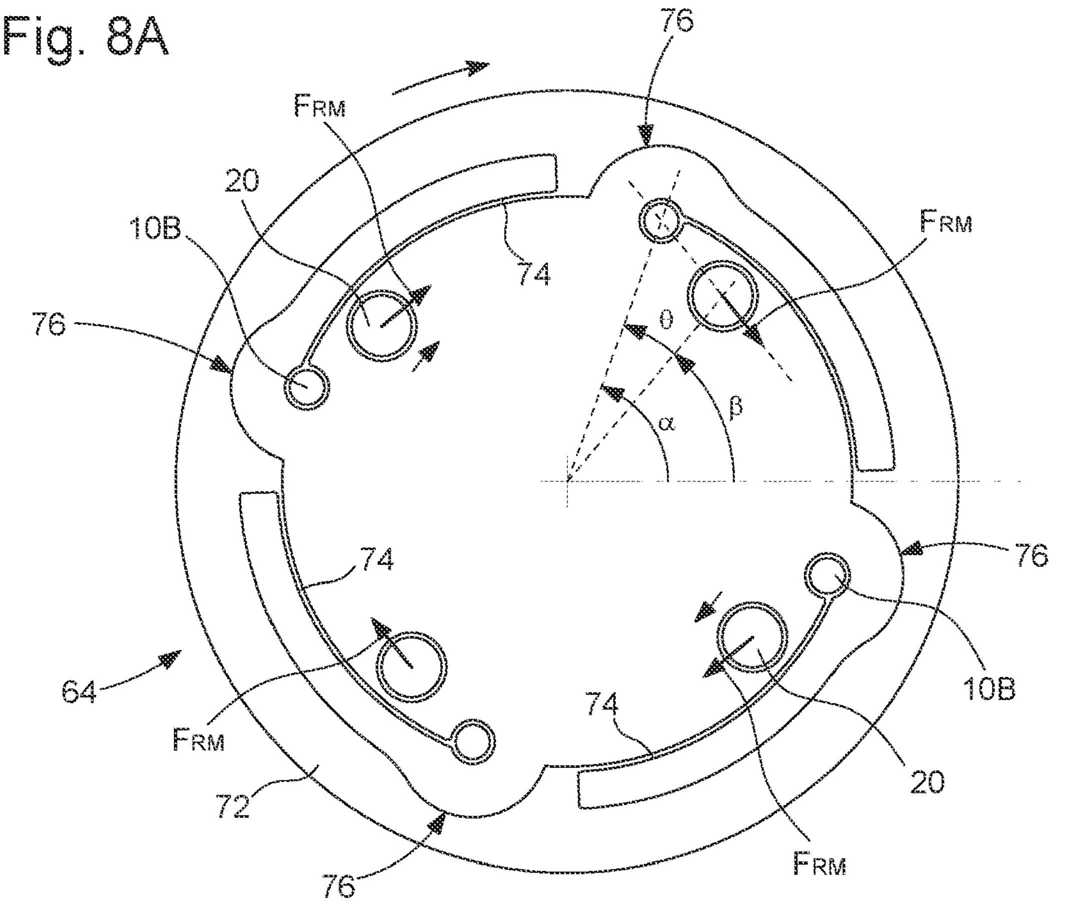
FIGS. 8A to 8H show the operation of the electromechanical converter of the third embodiment by a succession of instantaneous positions of the rotating rotor and of the mechanical resonator activated by this rotating rotor.
Figure 8B:
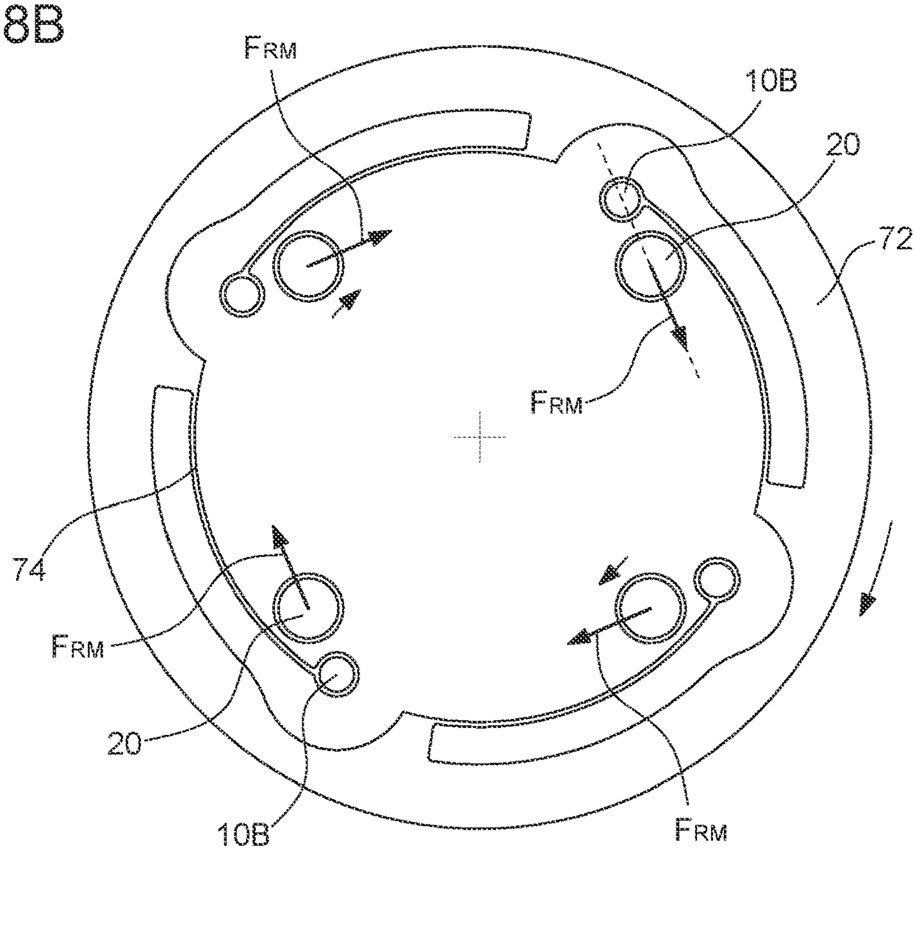

With reference to FIGS. 8A to 8H which show a section of the rotor, at the general plane wherein the magnets 10B and 20 are arranged, and only the four magnets 20 (one of which has a variable angular position β) for the mechanical resonator 12B, a succession of instantaneous states of the electromechanical converter 6B during its operation will be described. A particular case where the rotor 64 rotates substantially at constant speed in the clockwise direction is considered. In FIG. 8A, the magnets 10B of the rotor (one of which has an angular position α), carried by the respective flexible blades 74, have sufficiently approached the magnets 20 of the mechanical resonator (variable angular distance 8 between the magnets of the rotor and the corresponding magnets of the mechanical resonator) so that the magnetic repulsion force FRM therebetween is significant and sufficient to rotate the inertia mass 16B (represented here only by the four magnets 20). Already in FIG. 8A the benefit of the particular arrangement of the rotor and the mechanical resonator in the third embodiment of the invention is understood. The force FRM is essentially tangential, which has the consequence that substantially all this force FRM participates in the magnetic force torque applied to the inertia mass. By continuing its rotation, the rotor drives the inertia mass with a force FRM the intensity of which increases given the reduction in the distances between the first magnets 10B and the corresponding second magnets 20. Thanks to the presence of the free angular areas 78 previously described and the expected neutral radial position for each magnet 10B of the rotor, while the intensity of the force FRM increases sharply, the force FRM remains substantially tangential in the relative position of the snapshot shown in FIG. 8B. Thus, a magnetic torque of relatively high intensity is applied to the inertia mass of the mechanical resonator.

Figure 8C:
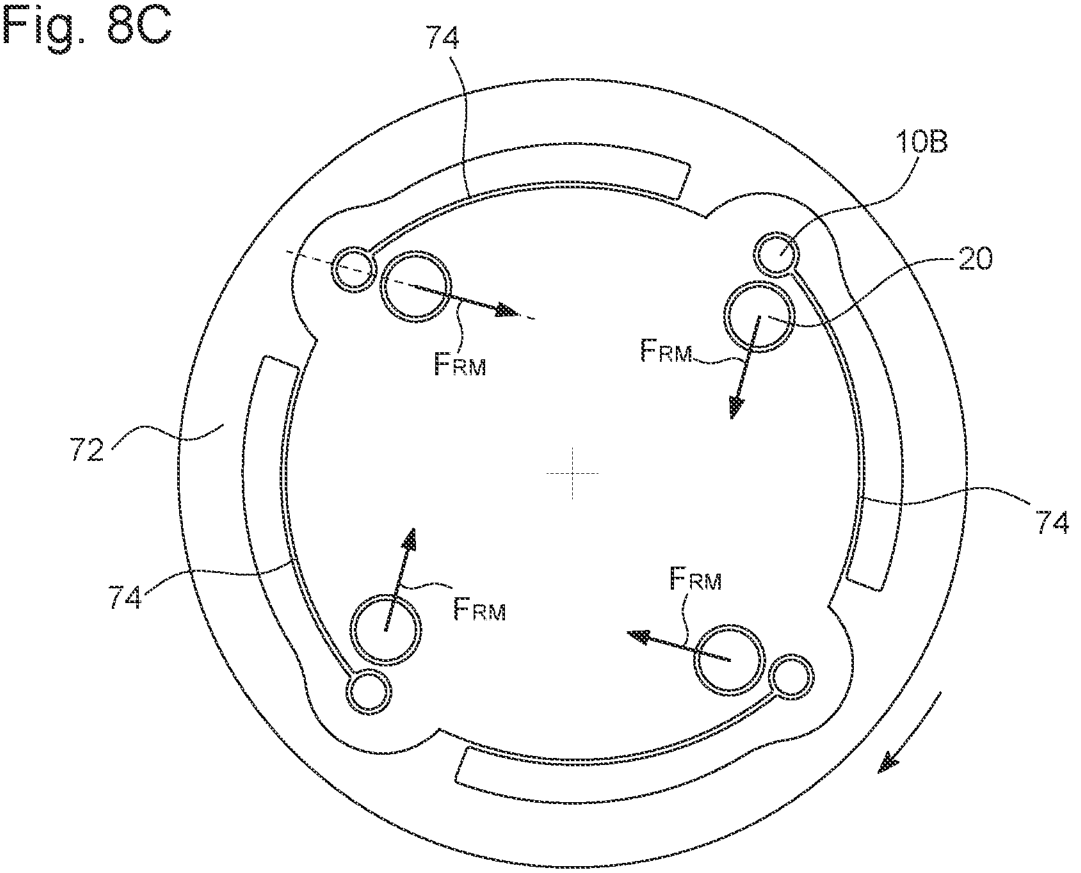

As the rotor continues to rotate in the clockwise direction, the radial component of the force FRM has a value which becomes relatively large, this radial component acting on each magnet 10B so that each magnet 10B begins to undergo radial elastic movement outward thanks to the flexible blade that carries it. The magnets 10B deviate from their circular trajectory so as to retract as these magnets pass through the respective angular positions of the magnets 20 of the inertia mass, as shown in the snapshot of FIG. 8C. While the magnets 10B of the rotor bypass the magnets 20 of the mechanical resonator under the action of the radial component of the magnetic repulsion force (also called 'radial magnetic force'), the inertia mass reaches a position of equilibrium of the tangential forces (tangential magnetic force and elastic return force of the mechanical resonator) and is thus at an extreme angular position (with zero angular speed) corresponding to the snapshot of FIG. 8C. Thus, the mechanical resonator is excited/activated by the rotating rotor and it starts to oscillate substantially at its resonant frequency $F_{Res}$ from this extreme angular position which determines an initial amplitude for this oscillation.

Figure 8D:
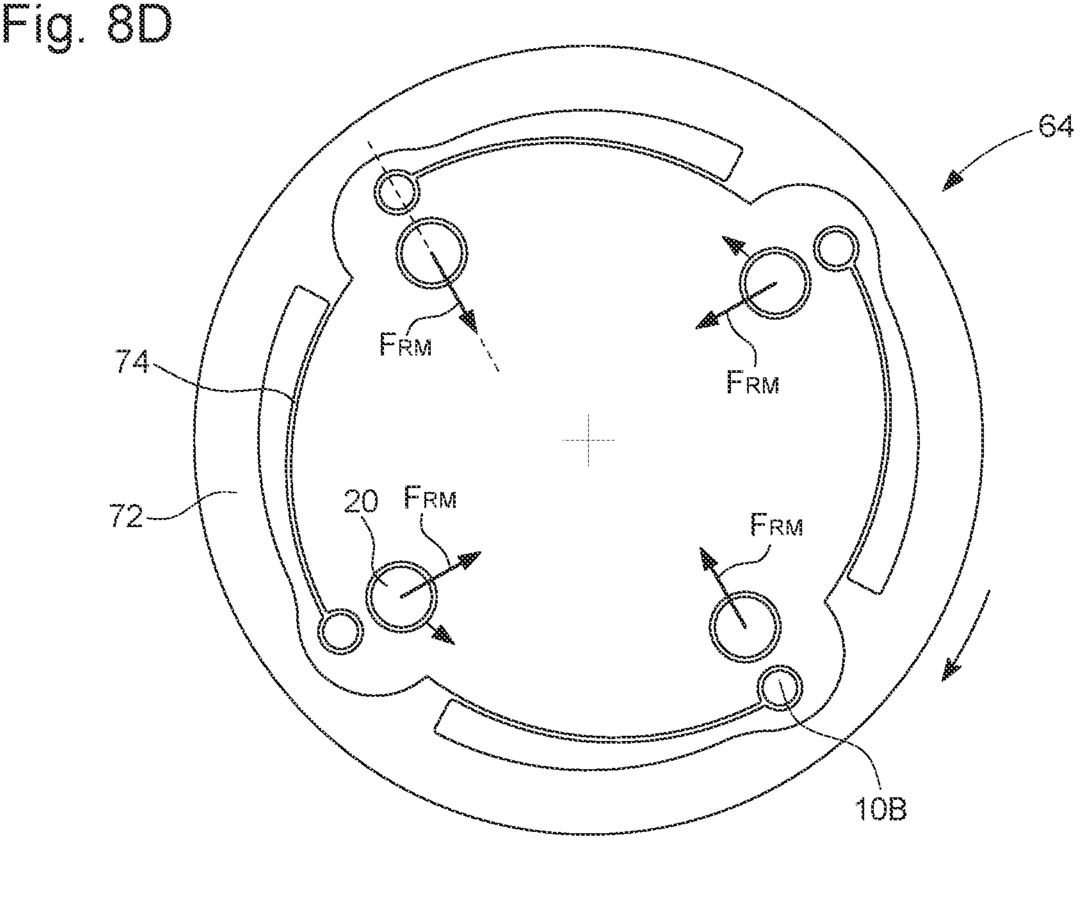
Figure 8E:
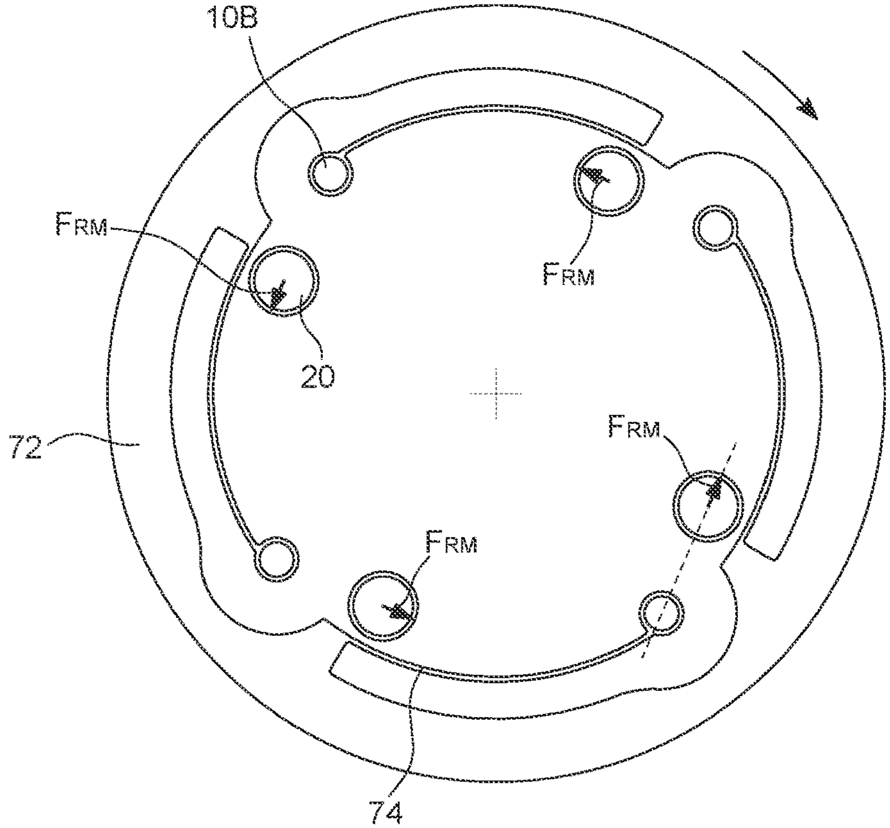
Figure 8F:
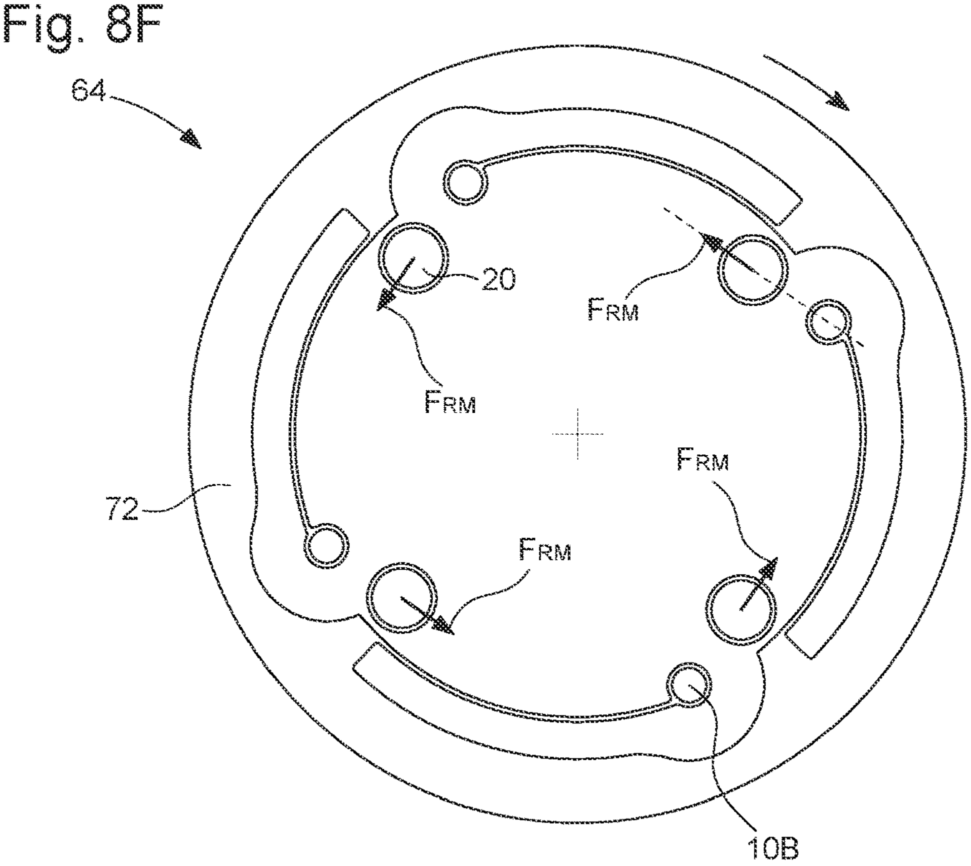
Figure 8G:
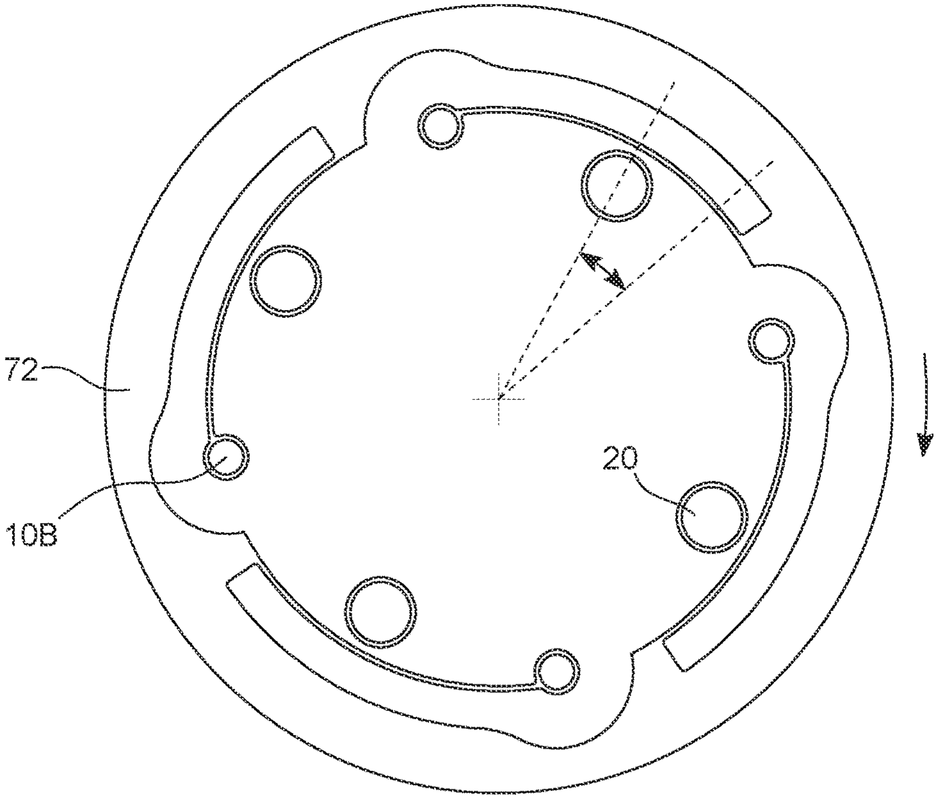
Figure 8H:
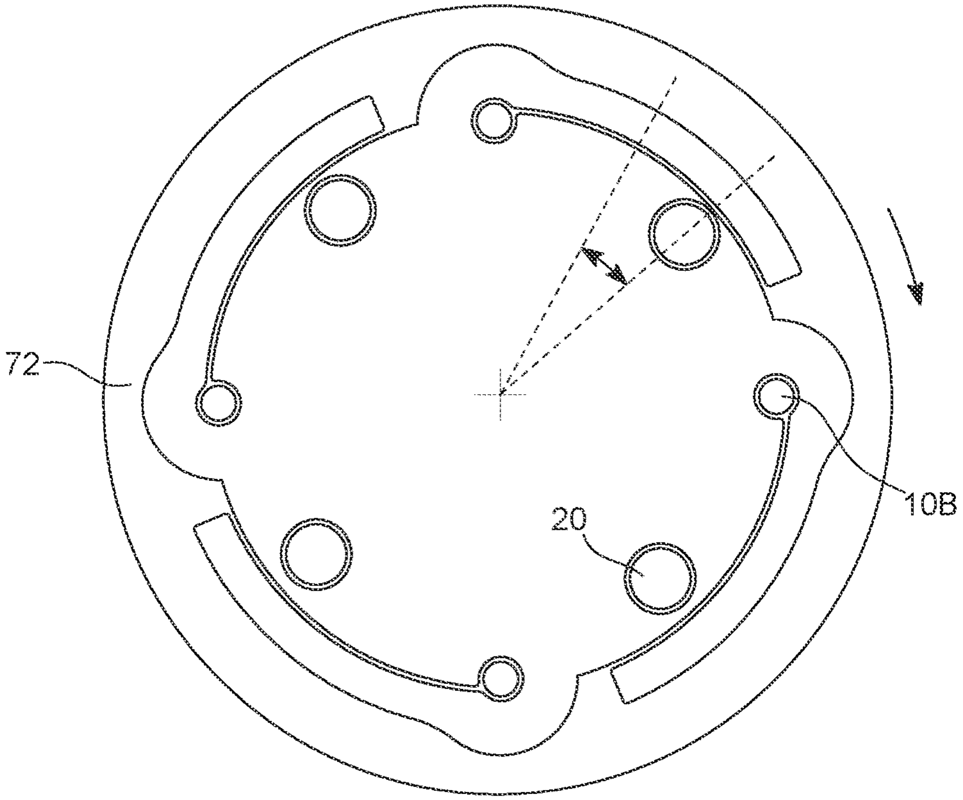

In FIG. 8D, while the magnets 10B and 20 are substantially radially aligned, the inertia mass has started a first cycle in the direction of rotation opposite to that of the rotor. Then, each magnet 10B having passed the magnet 20 with which it is momentarily associated during this activation/excitation of the mechanical resonator, the magnetic repulsion force therebetween momentarily drives the inertia mass in the counter-clockwise direction of its first vibration, which still provides additional energy to this inertia mass and participates in the activation/excitation of the mechanical resonator. FIG. 8E shows the instant of the end of the first vibration. As the resonant frequency $F_{Res}$ is expected to be relatively high, in the next vibration, the magnets 20 of the inertia mass rotate in the clockwise direction and approach the rotor magnets 10B again, as seen in FIG. 8F which shows the inertia mass again in an extreme angular position, although these rotor magnets 10B continue to rotate in the clockwise direction but at a speed slower than the average speed of the magnets 20 of the inertia mass. Note that the magnetic repulsion force FRM slows down the mechanical resonator and thus reduces its amplitude for this second vibration. However, since the magnetic force is a conservative force, most of the braking energy is returned to the mechanical resonator during the next vibration. FIG. 8G shows substantially the instant of the end of this next vibration. Then, in the specific considered case, the mechanical resonator still oscillates freely during two to three periods of oscillation before being again in a situation similar to that of FIG. 8B where a strong magnetic coupling occurs again between the rotor and the inertia mass of the mechanical resonator, so as to maintain the oscillation movement of the latter or generate a new oscillation of the mechanical resonator. FIG. 8H also shows a snapshot at the end of the vibration following the snapshot of FIG. 8G, these two figures indicating the angular area of free oscillation of the mechanical resonator. As already explained, when the magnets 20 of the inertia mass approach the magnet 10B of the rotor, the inertia mass generally undergoes a magnetic braking which can temporarily stop the oscillation in progress, during the passage of the rotor magnets through the respective angular positions of the magnets of the mechanical resonator. Thus, it is observed that successive oscillations of the mechanical resonator are substantially generated by the rotating rotor via the magnetic force FRM when it acts in the direction opposite to the direction of rotation of the rotor, that is to say after the magnets 10B of the rotor have passed, while retracting, the magnets 20 of the inertia mass, that is to say in time intervals according to the instantaneous state given in FIG. 8D.

Although the radial elastic constant of each elastic structure, formed of a magnet 10B and the flexible blade 74 which carries it, is selected so that it is small enough for the radial magnetic forces to displace the magnets 10B out of the circular area swept by the inertia mass, in particular by the magnets 20 and their respective straps during the passage of these magnets 10B through the angular positions of the magnets 20, it is expected that this radial elastic constant is however large enough for the radial oscillation frequency of each aforementioned elastic structure to be higher than the resonant frequency $F_{Res}$ of the mechanical resonator. For example, if the resonant frequency $F_{Res}$ is equal to 20 Hz, it is advantageous that the radial oscillation frequency of each elastic structure of the rotor is at least equal to twice $F_{Res}$, but preferably four to five times greater than $F_{Res}$, in particular equal to about 100 Hz. This ensures that the mechanical response of each elastic structure of the rotor is faster than the mechanical response of the mechanical resonator. Thus, the magnets 10B of the rotor are displaced sufficiently rapidly during the passage of these magnets through the angular positions of the magnets 20 so as to avoid collisions which would disturb the operation of the provided system.

The invention claimed is:

1. A wearable object comprising an electronic unit and a power supply unit formed by an electromechanical converter, wherein the electromechanical converter comprises:

a rotor capable of being rotated by movements that the wearable object can undergo, this rotor carrying at least a first permanent magnet;

a mechanical resonator mounted on a support and provided with an inertia mass capable of oscillating, around an axis of oscillation, at a resonant frequency ($F_{Res}$) specific to this mechanical resonator; and an electromagnetic system formed by at least a second permanent magnet and at least one coil which are respectively carried by the inertia mass and by said support or an element integral with this support and which are arranged so that, when the mechanical resonator is at rest, at least part of the magnetic flux generated by the second permanent magnet passes through the coil so that, when the mechanical resonator is oscillating, an induced voltage ($U_{Ind}$) is generated in this coil;

the electromechanical converter being arranged so that said at least one first permanent magnet and said at least one second permanent magnet can, during a rotational drive of the rotor, interact magnetically so as to apply to the inertia mass, momentarily or temporarily, a magnetic force torque allowing to excite the mechanical resonator, in order to generate at least one oscillation of this mechanical resonator substantially at its resonant frequency.

2. The wearable object according to claim 1, wherein the electromechanical converter is arranged so that said magnetic force torque applied to the inertia mass allows to generate, during said rotational drive of the rotor, a plurality of successive momentary oscillations, at said resonant frequency and with an amplitude substantially equal to or greater than a minimum amplitude for which said induced voltage is substantially equal to a predetermined threshold voltage, this plurality of successive momentary oscillations occurring respectively following a plurality of successive excitations of the mechanical resonator by the rotating rotor.

3. The wearable object according to claim 1, wherein, when the mechanical resonator is at rest, the centre of said second permanent magnet and the centre of said coil have a non-zero angular offset therebetween relative to said axis of oscillation.

4. The wearable object according to claim 1, wherein said mechanical resonator is a resonator with flexible blades.

5. The wearable object according to claim 4, wherein the flexible blades are made of a piezoelectric material and each coated with two electrodes through which an electric current is generated when the mechanical resonator is activated, this electric current being provided to an accumulator comprised in the power supply unit.

6. The wearable object according to claim 1, wherein said at least one first permanent magnet and said at least one second permanent magnet are arranged so that their magnetic interaction is in repulsion.

7. The wearable object according to claim 6, wherein said at least one first permanent magnet and said at least one second permanent magnet are located in the same general plane perpendicular to said axis of oscillation of the mechanical resonator.

8. The wearable object according to claim 7, wherein said at least one first permanent magnet and said at least one second permanent magnet have magnetisation axes substantially parallel to said axis of oscillation.

9. The wearable object according to claim 1, wherein said resonant frequency is substantially equal to or greater than ten Hertz ($F_{Res}$>=10 Hz).

10. The wearable object according to claim 4, wherein said inertia mass of the mechanical resonator is formed by a ring supporting said at least one second permanent magnet.

11. The wearable object according to claim 10, wherein the flexible blades connect said ring to a central element which is fixed to said support of the mechanical resonator; and wherein said rotor is mounted to rotate freely on a central part which is fixed to said central element, to said support or to an internal device which is integral with this central element or with this support and located on the other side of the inertia mass relative to the rotor.

12. The wearable object according to claim 1, wherein said rotor is mounted to rotate freely on a fixed structure of the wearable object by means of a ball or roller bearing, an inner ring of said bearing being formed by the rotor or integral with this rotor, while an outer ring of this bearing is formed by said fixed structure or integral with this fixed structure.

13. The wearable object according to claim 12, wherein a path of the bearing of said inner ring is formed by an outer lateral surface of the rotor, said bearing being arranged at the periphery of the rotor.

14. The wearable object according to claim 1, wherein the rotor is mounted to rotate freely on a back of a case wherein the electromechanical converter is housed.

15. The wearable object according to claim 7, wherein said at least one second permanent magnet is arranged so as to project from the inertia mass, so that this inertia mass has first and second free angular areas, respectively on both sides of the second magnet, wherein said at least one first permanent magnet of the rotor can move; and wherein said first permanent magnet is arranged so as to be able to undergo a radial elastic movement, relative to said axis of oscillation, under the action of a radial magnetic force which is generated by the magnetic interaction with said second permanent magnet when the first permanent magnet is located near the second permanent magnet, the minimum mechanical energy position of the first permanent magnet, relative to said rotor, corresponding to a radial position of this first magnet located in a range of radial positions, relative to said axis of oscillation, corresponding to said first and second free angular areas, said radial elastic movement being provided so that the first permanent magnet can retract sufficiently, when the first permanent magnet passes through the angular position of the second permanent magnet, to be able to switch from the first free angular area to the second free angular area.

16. The wearable object according to claim 15, wherein said at least one first permanent magnet is fixed respectively to the end of at least one corresponding elastic blade which is arranged so as to have a mainly tangential longitudinal axis and thus a capacity for elastic deformation essentially in a radial direction, relative to said axis of oscillation.

17. The wearable object according to claim 15, wherein said radial elastic movement under the action of said radial magnetic force is provided with an amplitude sufficient to avoid a shock between the rotor and the inertia mass of the mechanical resonator during the passage of the first permanent magnet through the angular position of the second permanent magnet.

18. The wearable object according to claim 1, wherein the rotor has an annular part which laterally surrounds the inertia mass of the mechanical resonator.

19. The wearable object according to claim 1, wherein the rotor is configured so as to have an unbalance to promote its rotation during said movements that the wearable object may undergo.

20. The wearable object according claim 1, wherein this wearable object is wearable on a user's wrist, in particular a wristwatch.

* * * * *